US010567133B2

(12) United States Patent
Si et al.

(10) Patent No.: US 10,567,133 B2
(45) Date of Patent: Feb. 18, 2020

(54) METHOD AND APPARATUS FOR SYNCHRONIZATION SIGNALS AND PBCH BLOCK ENHANCEMENT

(71) Applicant: Samsung Electronics Co., Ltd., Suwon-si, Gyeonggi-do (KR)

(72) Inventors: Hongbo Si, Plano, TX (US); Yingzhe Li, Sunnyvale, CA (US); Le Liu, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/035,331

(22) Filed: Jul. 13, 2018

(65) Prior Publication Data
US 2019/0028244 A1   Jan. 24, 2019

Related U.S. Application Data

(60) Provisional application No. 62/536,204, filed on Jul. 24, 2017, provisional application No. 62/669,713, (Continued)

(51) Int. Cl.
*H04W 72/04* (2009.01)
*H04B 7/06* (2006.01)
(Continued)

(52) U.S. Cl.
CPC ............ *H04L 5/005* (2013.01); *H04L 5/0053* (2013.01); *H04W 72/042* (2013.01); *H04W 72/0446* (2013.01); *H04B 7/0617* (2013.01)

(58) Field of Classification Search
CPC ... H04B 7/0617; H04L 27/0006; H04L 5/005; H04L 5/0051; H04L 5/0053;
(Continued)

(56) References Cited

U.S. PATENT DOCUMENTS 10,362,610 B2 * 7/2019 Chen ..................... H04L 5/0048
2013/0003672 A1   1/2013 Dinan
(Continued)

FOREIGN PATENT DOCUMENTS

WO   2013006379 A1   1/2013
WO   2014161106 A1   10/2014
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.
(Continued)

*Primary Examiner* — Ahmed Elallam

(57) ABSTRACT

A method of a user equipment (UE) for receiving signals in a wireless communication system is provided. The method comprises receiving an enhanced synchronization signal and physical broadcast channel (eSS/PBCH) block comprising multiple consecutive symbols over downlink channels, wherein each of the multiple consecutive symbols of the eSS/PBCH block is received from a same antenna port of the BS; determining resources in the downlink channels to receive the eSS/PBCH block from the BS; and determining the eSS/PBCH block comprising the multiple consecutive symbols based on the determined resources, wherein each of the multiple consecutive symbols includes at least one of a primary synchronization signal (PSS), a secondary synchronization signal (SSS), an enhanced PSS (ePSS), an enhanced SSS (eSSS), or an enhanced PBCH (ePBCH).

20 Claims, 21 Drawing Sheets

Related U.S. Application Data filed on May 10, 2018, provisional application No. 62/690,666, filed on Jun. 27, 2018, provisional application No. 62/693,059, filed on Jul. 2, 2018.

(51) Int. Cl.
*H04L 7/06* (2006.01)
*H04L 5/00* (2006.01)

(58) Field of Classification Search
CPC ... H04W 48/12; H04W 56/00; H04W 72/042; H04W 72/0446
See application file for complete search history.

(56) References Cited

U.S. PATENT DOCUMENTS

| | | | |
|---|---|---|---|
| 2014/0301353 A1 | 10/2014 | Frenne et al. | |
| 2015/0016337 A1* | 1/2015 | Chung | H04W 56/0085 370/328 |
| 2016/0227567 A1 | 8/2016 | Xu et al. | |
| 2017/0353255 A1* | 12/2017 | Islam | H01Q 3/2605 |
| 2017/0353256 A1* | 12/2017 | Islam | H01Q 3/2605 |
| 2018/0123849 A1* | 5/2018 | Si | H04J 11/0076 |
| 2018/0184390 A1 | 6/2018 | Wu et al. | |
| 2018/0248642 A1* | 8/2018 | Si | H04L 5/0053 |
| 2018/0262308 A1* | 9/2018 | Si | H04L 5/0051 |
| 2019/0123874 A1* | 4/2019 | Liu | H04L 5/0048 |
| 2019/0140689 A1* | 5/2019 | Wang | H04B 1/7083 |
| 2019/0215782 A1* | 7/2019 | Lee | H04L 1/00 |
| 2019/0268866 A1* | 8/2019 | Qu | H04L 27/2655 |

FOREIGN PATENT DOCUMENTS

| | | |
|---|---|---|
| WO | 2014163543 A1 | 10/2014 |
| WO | 2017018966 A1 | 2/2017 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.

"3rd Generation Partnership Project; Technical Specification Group Radio Access Network; Evolved Universal Terrestrial Radio Access (E-UTRA); Physical Layer Procedures (Release 13)," 3GPP TS 36.213, V13.2.0, Jun. 2016, 381 pages.

"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.

"3rd Generation Partnership Project; Technical Specification Group Radio Access Network; Evolved Universal Terrestrial Radio Access (E-UTRA); Radio Resource Control (RRC) Protocol Specification (Release 13)," 3GPP TS 36.331, V13.2.0, Jun. 2016, 623 pages.

ISA/KR, "International Search Report and Written Opinion of the International Searching Authority," International Application No. PCT/KR2018/008373, Oct. 31, 2018, 4 pages.

* cited by examiner

METHOD AND APPARATUS FOR SYNCHRONIZATION SIGNALS AND PBCH BLOCK ENHANCEMENT

CROSS-REFERENCE TO RELATED APPLICATION(S) AND CLAIM OF PRIORITY

The present application claims priority to:
U.S. Provisional Patent Application Ser. No. 62/536,204, filed on Jul. 24, 2017;
U.S. Provisional Patent Application Ser. No. 62/669,713, filed on May 10, 2018;
U.S. Provisional Patent Application Ser. No. 62/690,666, filed on Jun. 27, 2018; and
U.S. Provisional Patent Application Ser. No. 62/693,059, filed on Jul. 2, 2018.
The content of the above-identified patent documents is incorporated herein by reference.

TECHNICAL FIELD

The present disclosure relates generally to wireless communication systems and, more specifically, to the synchronization signals and PBCH block enhancement in an advanced wireless communication system.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an NR-SS burst set design in an advanced wireless communication system.

In one embodiment, a user equipment (UE) for receiving signals in a wireless communication system, the UE includes a transceiver configured to receive, from a base station (BS), an enhanced synchronization signal and physical broadcast channel (eSS/PBCH) block comprising multiple consecutive symbols over downlink channels. Each of the multiple consecutive symbols of the eSS/PBCH block is received from a same antenna port of the BS. The UE further includes a processor operably connected to the transceiver, the processor configured to determine resources in the downlink channels to receive the eSS/PBCH block from the BS, and determine the eSS/PBCH block comprising the multiple consecutive symbols based on the determined resources, wherein each of the multiple consecutive symbols includes at least one of a primary synchronization signal (PSS), a secondary synchronization signal (SSS), an enhanced PSS (ePSS), an enhanced SSS (eSSS), or an enhanced PBCH (ePBCH).

In another embodiment, a base station (BS) for transmitting signals in a wireless communication system, the BS includes a processor configured to determine resources in downlink channels to transmit an enhanced synchronization signal and physical broadcast channel (eSS/PBCH) block to a user equipment (UE), and generate the eSS/PBCH block comprising multiple consecutive symbols based on the determined resources, wherein each of the multiple consecutive symbols includes at least one of a primary synchronization signal (PSS), a secondary synchronization signal (SSS), an enhanced PSS (ePSS), an enhanced SSS (eSSS), or an enhanced PBCH (ePBCH). The BS further includes a transceiver operably connected to the processor, the transceiver configured to transmit, to the UE, the eSS/PBCH block over the downlink channels. Each of multiple consecutive symbols of the eSS/PBCH block is transmitted using a same antenna port for the transceiver.

In yet another embodiment, a method of a user equipment (UE) for receiving signals in a wireless communication system, the method comprises receiving an enhanced synchronization signal and physical broadcast channel (eSS/PBCH) block comprising multiple consecutive symbols over downlink channels, wherein each of the multiple consecutive symbols of the eSS/PBCH block is received from a same antenna port of the BS, determining resources in the downlink channels to receive the eSS/PBCH block from the BS, and determining the eSS/PBCH block comprising the multiple consecutive symbols based on the determined resources, wherein each of the multiple consecutive symbols includes at least one of a primary synchronization signal (PSS), a secondary synchronization signal (SSS), an enhanced PSS (ePSS), an enhanced SSS (eSSS), or an enhanced PBCH (ePBCH).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0 "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
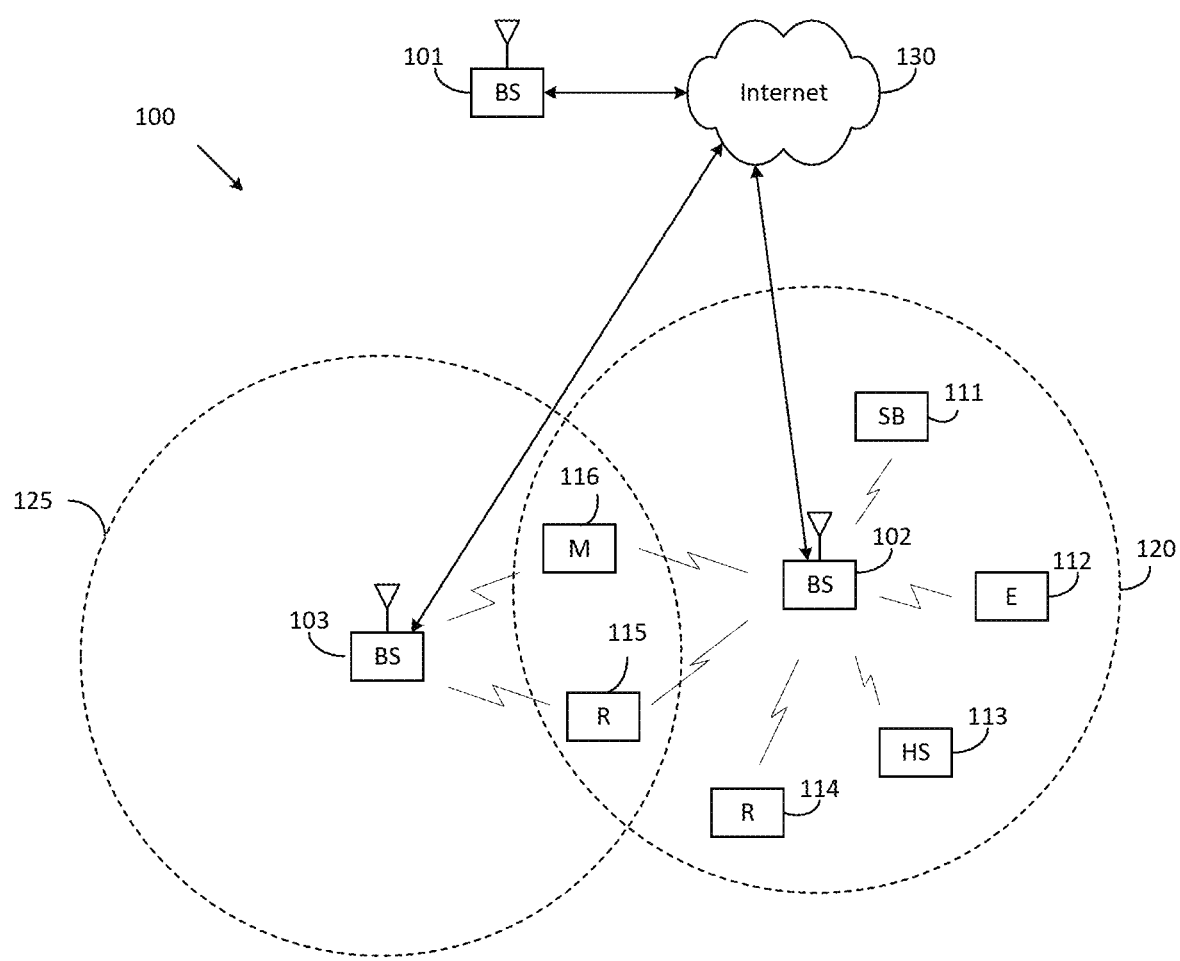
FIG. 1 illustrates an example wireless network according to embodiments of the present disclosure.
Figure 2:
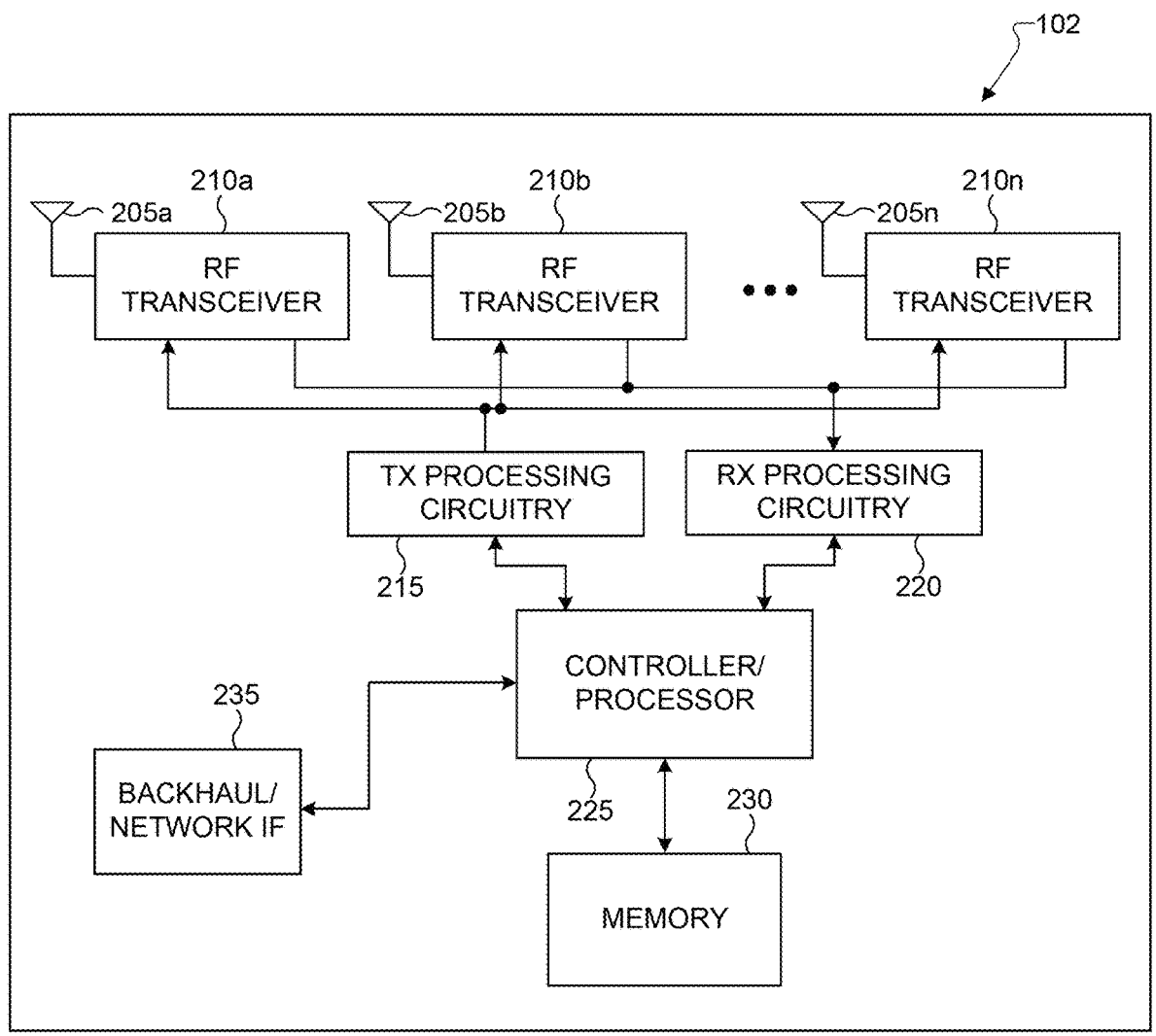
FIG. 2 illustrates an example eNB according to embodiments of the present disclosure.
Figure 3:
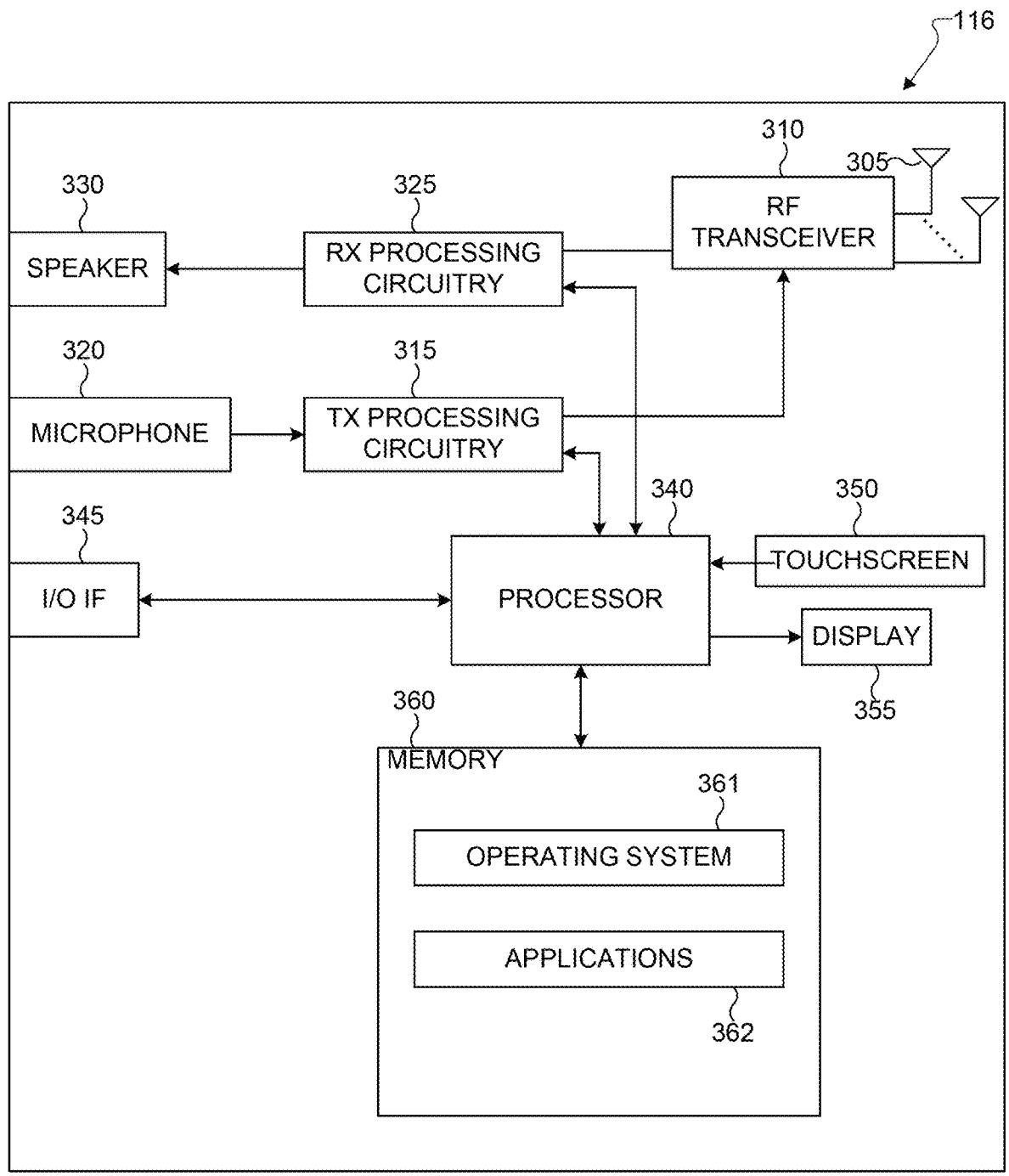
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient synchronization signals and PBCH block control in an advanced wireless communication system. In certain embodiments, and one or more of the eNBs 101-103 includes circuitry, programming, or a combination thereof, for receiving efficient synchronization signals and PBCH block control in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
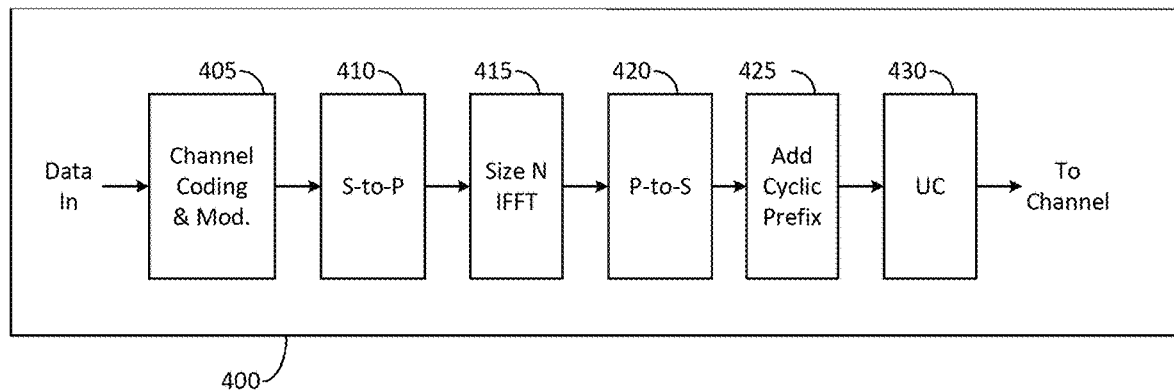
FIG. 4A illustrates a high-level diagram of an orthogonal frequency division multiple access transmit path according to embodiments of the present disclosure.
Figure 4B:
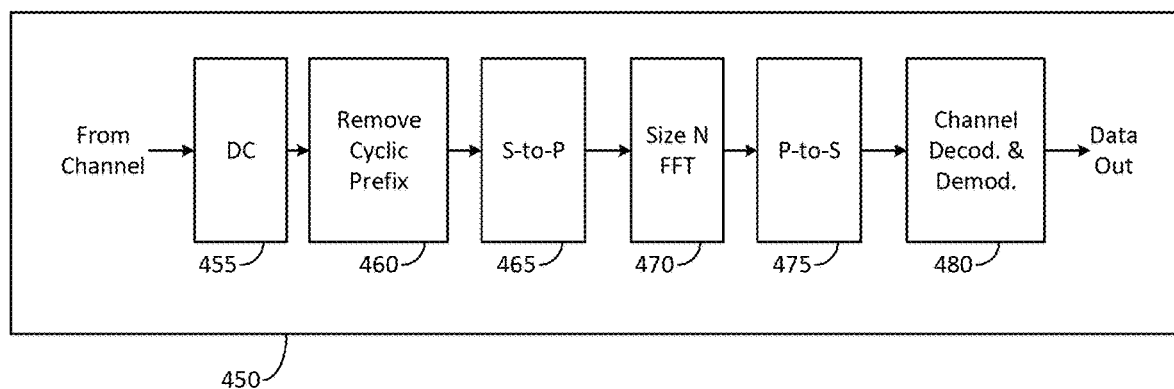
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
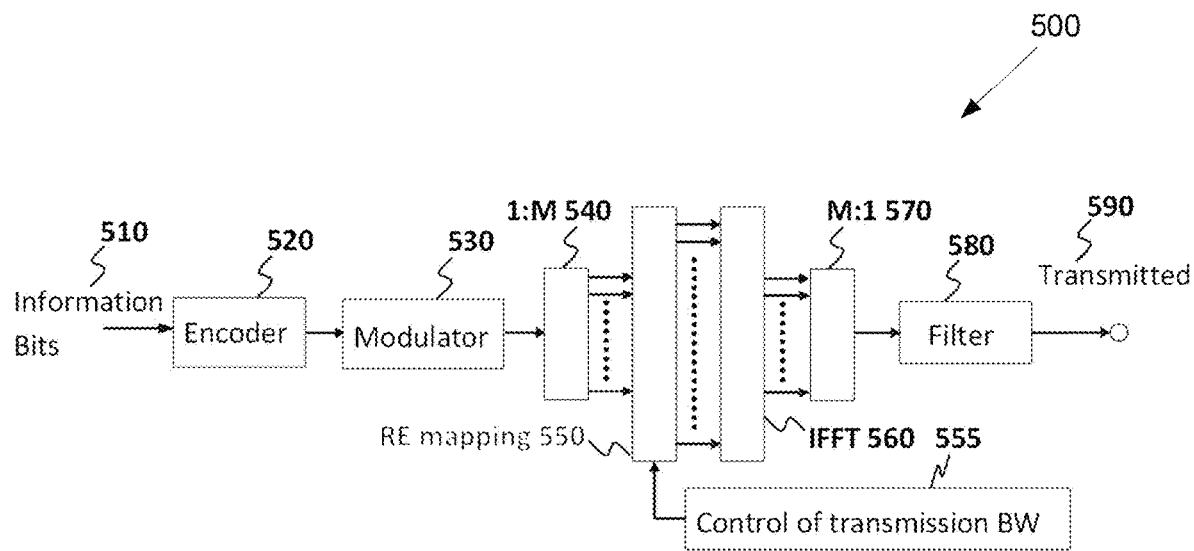
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
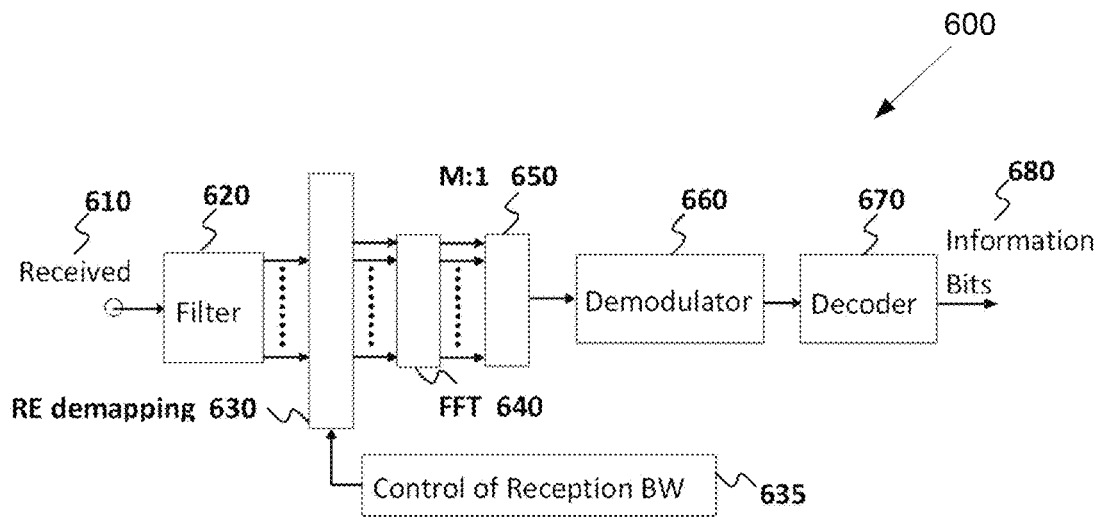
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
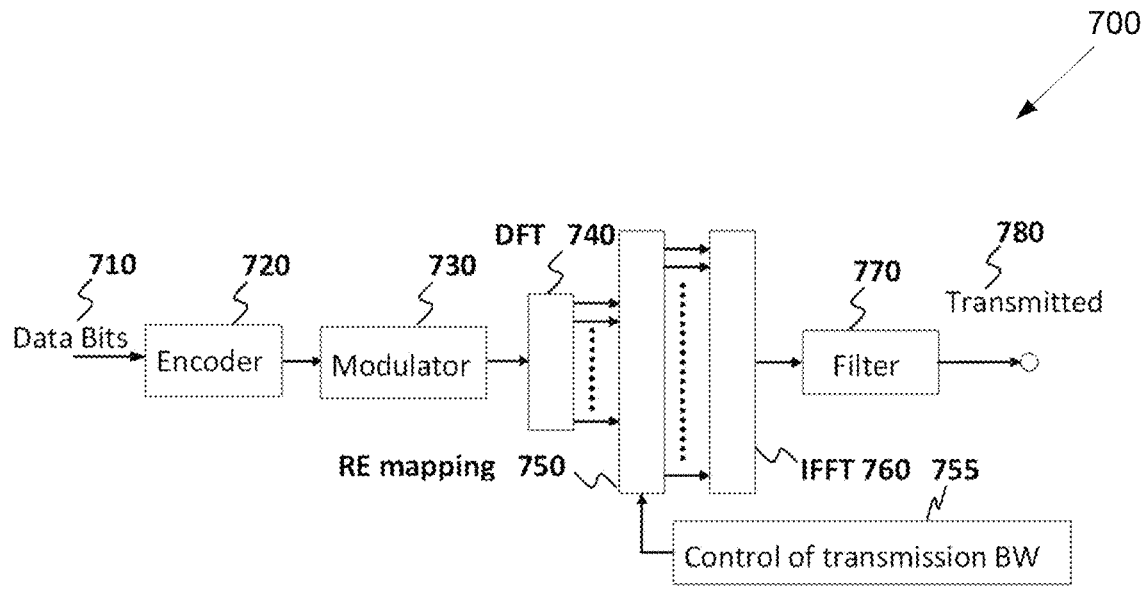
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
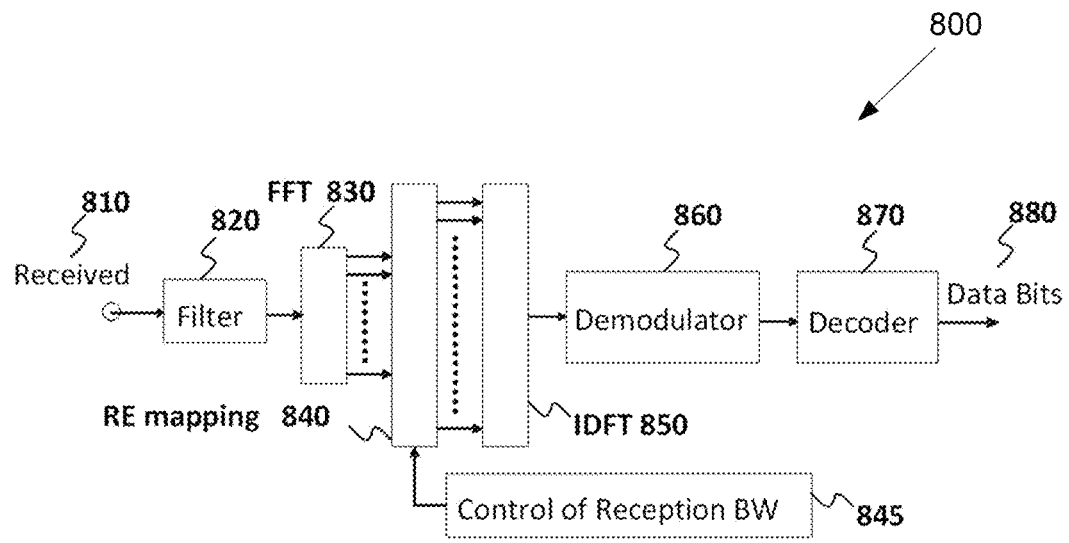
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
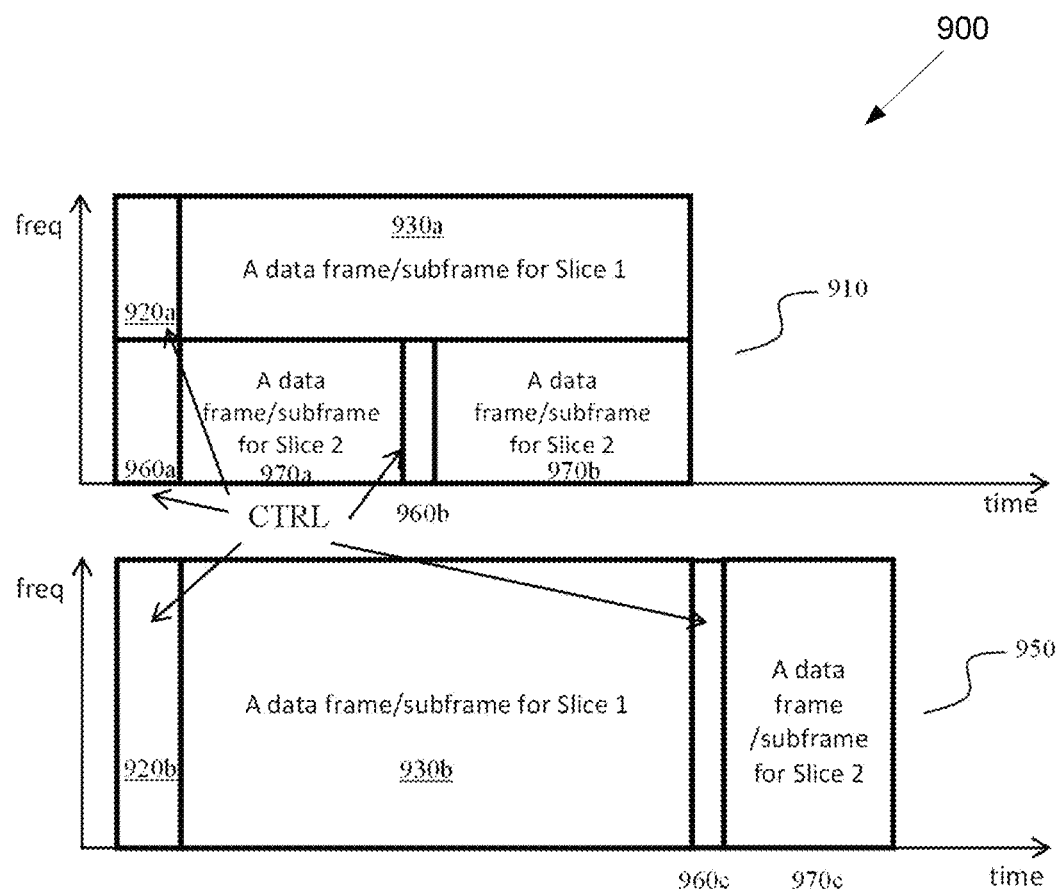
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
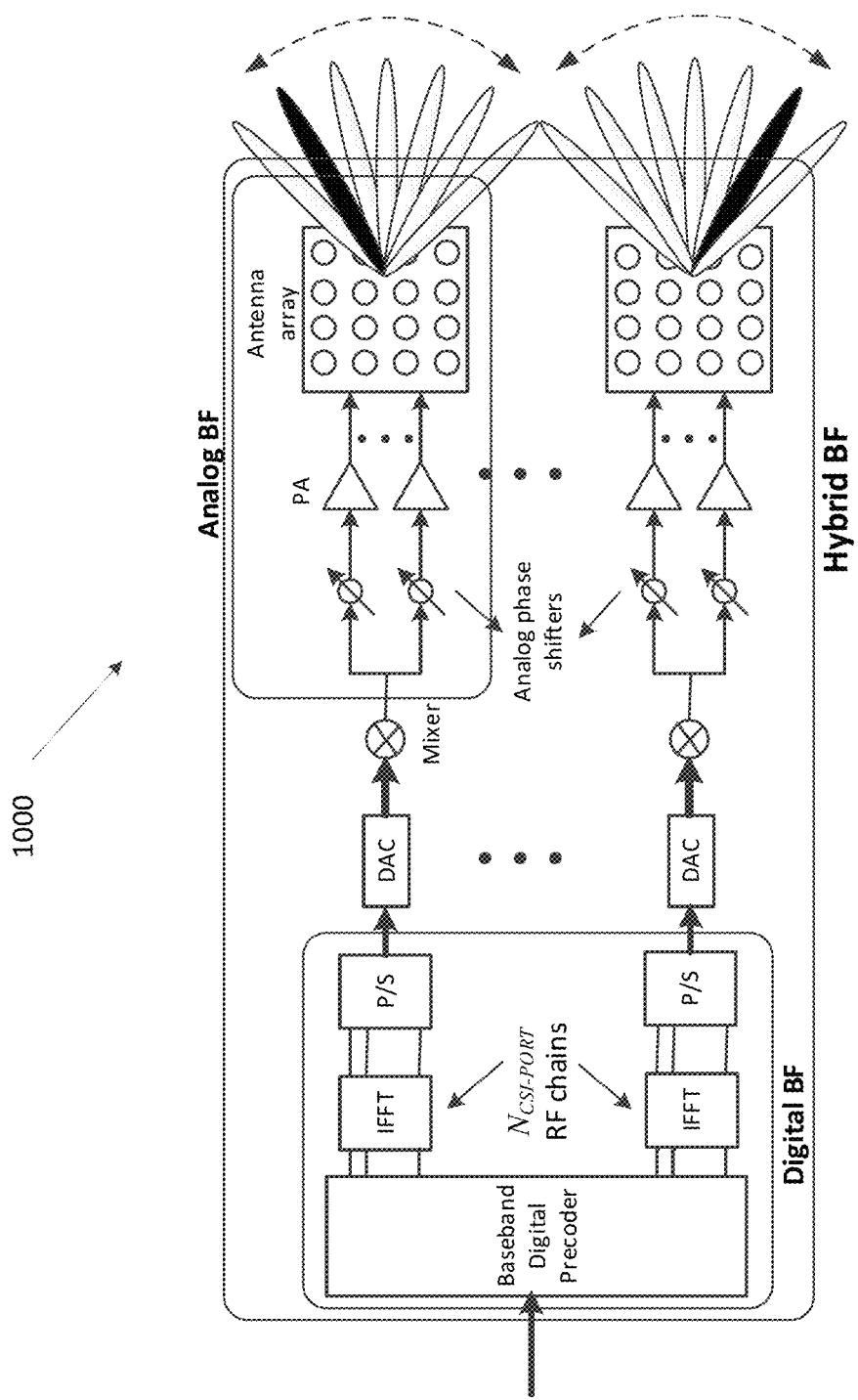
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
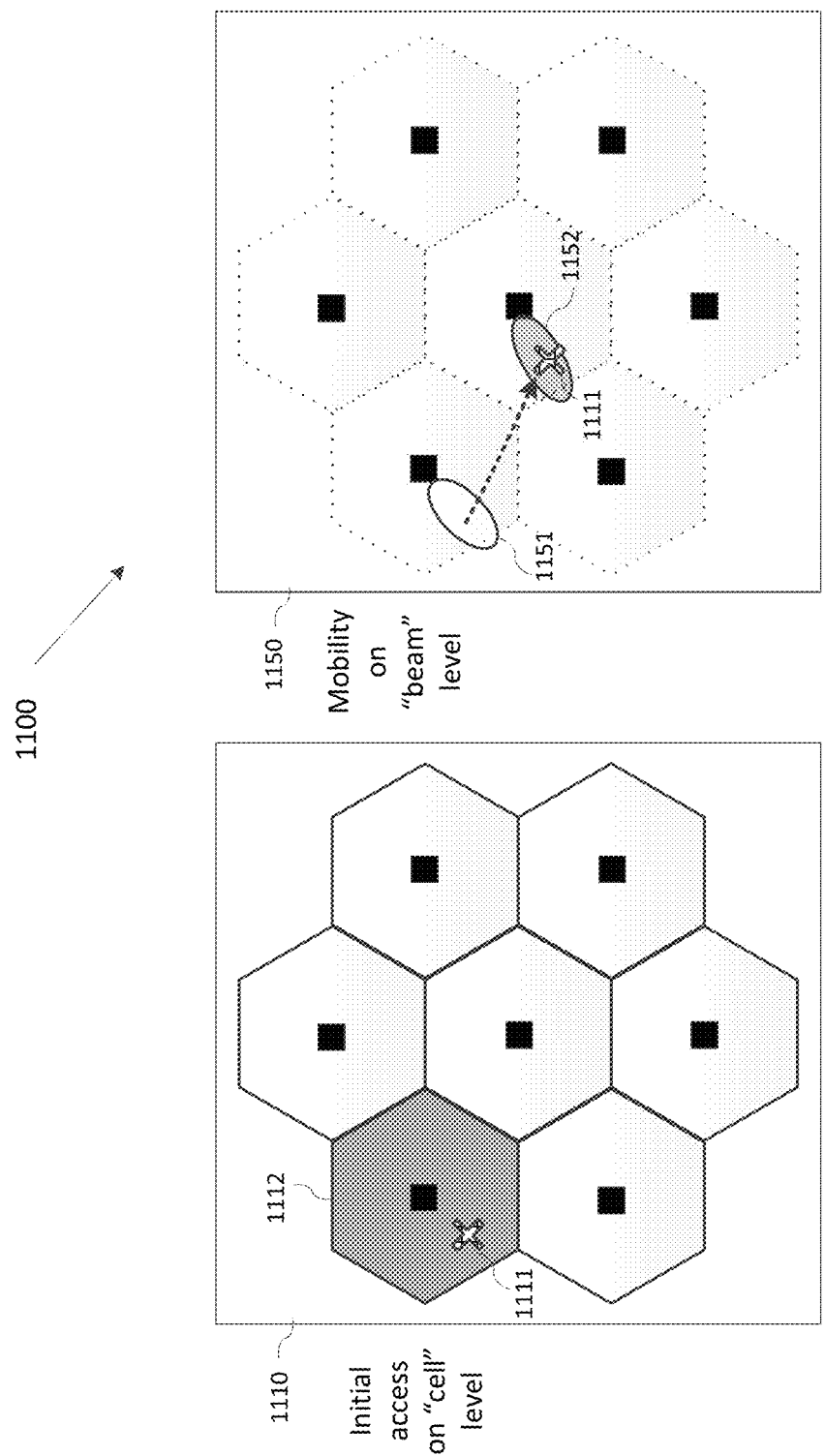
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with Nbeams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
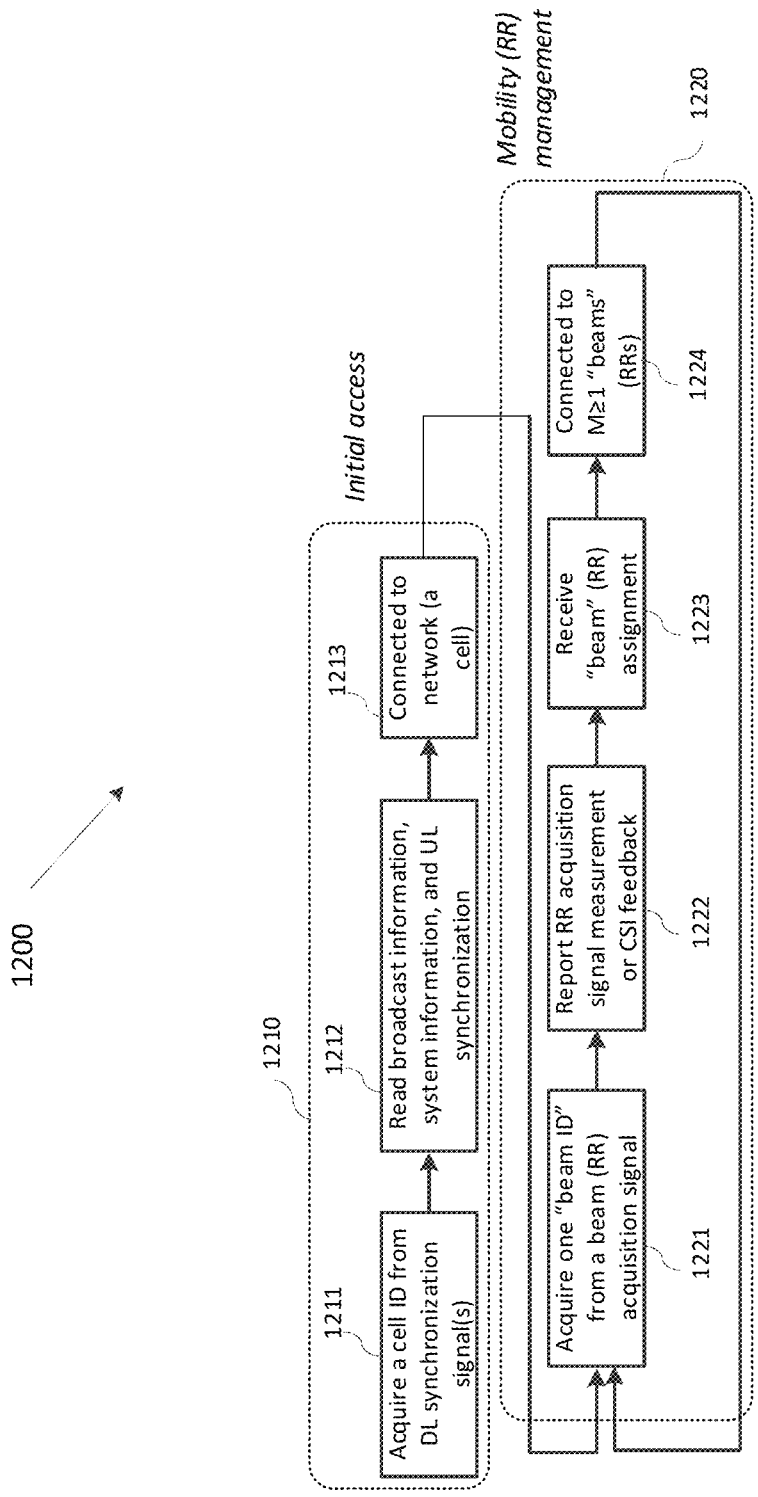
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

For LTE NR, synchronization signals and PBCH block (NR-SS/PBCH block) is designed for enhanced Mobile Broadband (eMBB) purpose and for licensed bands only. Each NR-SS/PBCH block compromises of one symbol for NR-PSS, one symbol for NR-SSS multiplexed with part of NR-PBCH in frequency-domain, and two symbols for the remaining of NR-PBCH, wherein the four symbols are mapped consecutively and time division multiplexed.

NR-SS/PBCH is a unified design, including the NR-PSS and NR-SSS sequence design, for all the supported carrier frequency ranges in NR. The transmission bandwidth of NR-PSS and NR-SSS (e.g. 12 PRBs) is smaller than the transmission bandwidth of NR-PBCH (e.g. 20 PRBs), and the total transmission bandwidth of NR-SS/PBCH block is same as the one of NR-PBCH (e.g. 20 PRBs). In initial cell selection for NR, a UE assumes the default NR-SS/PBCH burst set periodicity as 20 ms, and for detecting non-standalone NR cells, network provides one NR-SS/PBCH burst set periodicity information per frequency carrier to the UE and information to derive measurement timing/duration if possible.

For NR unlicensed spectrum (including shared spectrum), due to the uncertainty of channel access, the transmission of NR-SS/PBCH block can be cancelled or delayed based on the clear channel assessment (CCA) results in listen-before-talk (LBT). For V2X sidelink synchronization or URLLC system, the synchronization delay requirement is much more restricted than LTE NR, which requires more accurate synchronization performance in one-shot detection to avoid larger number of combining of NR-SS/PBCH blocks and reduce the synchronization latency. For MTC or IoT systems, the operating SNR region is much lower than LTE NR, which also required better one-shot detection performance to avoid significant weak coverage issue.

For at least one of the above-mentioned systems, if the synchronization signals for those systems remains the same as in LTE NR, the performance (e.g. detection accuracy and synchronization latency) may degrade. Hence, there is a need for NR-SS/PBCH block enhancement and/or modification for at least one of the above-mentioned systems (different system may use the same or different enhancement schemes discussed in this disclosure). For example, the enhancement and/or modification can aim at increasing the channel access opportunity, e.g. for unlicensed spectrum. For another example, the enhancement and/or modification can aim at improving the one-shot detection accuracy of cell search and/or broadcasting, e.g. for unlicensed/V2X/URLLC/MTC/IoT system.

The principal design consideration is whether to adopt a unified enhanced NR-SS/PBCH block design (e.g. composition and/or mapping and/or multiplexing in an enhanced NR-SS/PBCH block) for different the application scenarios, where the scenarios include different carrier frequency ranges, standalone or non-standalone, and etc.

In one embodiment, the design of composition/mapping/multiplexing in an enhanced NR-SS/PBCH block can be unified for all carrier frequency ranges (e.g. 5 GHz, 6 GHz, and 60 GHz unlicensed spectrums use the same design) and both standalone and non-standalone scenarios. The unified design is beneficial for minimizing the detector complexity. Note that the unified design of enhanced NR-SS/PBCH block does not exclude possible different design of transmission periodicity and/or LBT of the enhanced NR-SS/PBCH block. For example, although utilizing the same composition/mapping/multiplexing in an enhanced NR-SS/PBCH block, different transmission periodicity and/or LBT procedure (if applicable) can be utilized for different carrier frequency ranges and/or standalone and non-standalone scenarios.

In another embodiment, the design of composition/mapping/multiplexing in an enhanced NR-SS/PBCH block is unified for all carrier frequency ranges (e.g. 5 GHz, 6 GHz, and 60 GHz unlicensed spectrums use the same design), but different for standalone and non-standalone scenarios. For example, a unified design of composition/mapping/multiplexing in an enhanced NR-SS/PBCH block is utilized for a standalone scenario and all carrier frequency ranges, and another unified design of composition/mapping/multiplexing in an enhanced NR-SS/PBCH block is utilized for non-standalone scenario and all carrier frequency ranges. Note that the unified design of enhanced NR-SS/PBCH block does not exclude possible different design of transmission periodicity and/or LBT procedure (if applicable) for the enhanced NR-SS/PBCH block.

In yet another embodiment, the composition/mapping/multiplexing in an enhanced NR-SS/PBCH block is unified for standalone and non-standalone scenarios, but different for different carrier frequency ranges (e.g. 5 GHz, 6 GHz, and 60 GHz unlicensed spectrums use different designs). Note that the unified design of enhanced NR-SS/PBCH block does not exclude possible different design of transmission periodicity and/or LBT procedure (if applicable) for the enhanced NR-SS/PBCH block. For example, although utilizing the same composition/mapping/multiplexing in an enhanced NR-SS/PBCH block, different transmission periodicity and/or LBT procedure (if applicable) can be utilized for standalone and non-standalone scenarios.

In yet another embodiment, the composition/mapping/multiplexing in an enhanced NR-SS/PBCH block is specific for each carrier frequency range (e.g. 5 GHz, 6 GHz, and 60 GHz unlicensed spectrums use different designs) and standalone/non-standalone scenario.

Another important design consideration is the default periodicity of the enhanced NR-SS/PBCH block (or equivalently as the default periodicity of the enhanced NR-SS/PBCH burst set) from the detector perspective. Note that for the enhanced NR-SS/PBCH blocks transmitted within a DRS measurement timing configuration (DMTC), the default periodicity of the enhanced NR-SS/PBCH block (or equivalently as the default periodicity of the enhanced NR-SS/PBCH burst set) can be considered as the default periodicity of DMTC, although the actual transmission of the enhanced NR-SS/PBCH blocks may not be strictly periodic.

In one embodiment, to enhance the channel access opportunities (e.g. for NR unlicensed spectrum), the default periodicity of the enhanced NR-SS/PBCH block (or equivalently as the default periodicity of the enhanced NR-SS/PBCH burst set or the default periodicity of DMTC) can be reduced as compared to NR licensed spectrum. For example, the default periodicity can be reduced to 10 ms or 5 ms.

In another embodiment, the default periodicity of the enhanced NR-SS/PBCH block (or equivalently as the default periodicity of the enhanced NR-SS/PBCH burst set or the default periodicity of DMTC) can remain the same as LTE NR (e.g. 20 ms). For example, the duration of LBT procedure for the enhanced NR-SS/PBCH block can be minimized to enhance the channel access opportunity for NR unlicensed spectrum.

The next design consideration is repetitive and/or additional and/or enhanced transmission of NR-PSS/SSS/PBCH (termed as NR-ePSS/eSSS/ePBCH) within an enhanced NR-SS/PBCH block, in order to enhance the one-shot synchronization/broadcasting performance (note that the signal/channel design of the NR-ePSS/eSSS/ePBCH can be the same as NR-PSS/SSS/PBCH or can be the same as NR-PSS/SSS/PBCH for certain scenarios).

In one embodiment, the enhanced NR-SS/PBCH block only consists of NR-ePSS/eSSS/ePBCH.

In one example, NR-ePSS/eSSS/ePBCH are time division multiplexed (wherein NR-eSSS and part of the NR-ePBCH can be frequency division multiplexed in the same symbol). For example, NR-PSS/SSS/PBCH are replaced by NR-ePSS/eSSS/ePBCH but multiplexed and mapped the same way as LTE NR-SS/PBCH block.

In another example, NR-ePSS/eSSS/ePBCH are multiplexed and/or mapped differently from LTE NR-SS/PBCH block. For example, NR-ePSS/eSSS/ePBCH are frequency division multiplexed, or a mixture of time division and frequency division multiplexed.

In another embodiment, the enhanced NR-SS/PBCH block consists of both at least one of NR-PSS/SSS/PBCH and at least one of their enhancement NR-ePSS/eSSS/ePBCH.

In another embodiment, NR-ePSS/eSSS/ePBCH are time division multiplexed with NR-PSS/SSS/PBCH (note that there can be symbols in the enhanced NR-SS/PBCH block containing FDMed NR-SSS/NR-PBCH and/or FDMed NR-eSSS/NR-ePBCH).

In one example, when both NR-ePSS and NR-PSS are supported in an enhanced NR-SS/PBCH block, the symbols mapped for NR-ePSS and NR-PSS correspondingly are TDMed and consecutive, e.g. in order to easy the implementation of NR-PSS/NR-ePSS joint detection in time domain.

In another example, when more than one NR-ePSS are supported in an enhanced NR-SS/PBCH block, the symbols mapped for NR-ePSS are TDMed and consecutive, e.g. in order to easy the implementation of NR-ePSS joint detection in time domain.

In yet another example, when both NR-eSSS and NR-SSS are supported in an enhanced NR-SS/PBCH block, the symbols mapped for NR-eSSS and NR-SSS correspondingly are TDMed and non-consecutive, e.g. symbol(s) between NR-eSSS and NR-SSS can be mapped to NR-PBCH/NR-ePBCH.

In yet another example, when more than one NR-eSSS are supported in an enhanced NR-SS/PBCH block, the symbols mapped for NR-eSSS are TDMed and non-consecutive, e.g. symbol(s) among NR-eSSS can be mapped to NR-PBCH/NR-ePBCH.

In one embodiment, NR-ePSS/eSSS/ePBCH are frequency division multiplexed with LTE NR-PSS/SSS/PBCH.

In another embodiment, NR-ePSS/eSSS/ePBCH are multiplexed with LTE NR-PSS/SSS/PBCH in a mixture way of time division multiplexing and frequency division multiplexing.

In yet another embodiment, the enhanced NR-SS/PBCH block only consists of LTE NR-PSS/SSS/PBCH. For example, enhanced NR-SS/PBCH block on the unlicensed spectrum only consists of NR-PSS and NR-SSS for certain application scenarios (e.g. non-standalone scenario).

In yet another embodiment, the NR-PSS/SSS/PBCH within the enhanced NR-SS/PBCH block are time division multiplexed.

Note that combined with the previous design considerations, the above embodiments can apply to different application scenarios. For example, enhanced NR-SS/PBCH block consisting of LTE NR-PSS/SSS/PBCH only is utilized for non-standalone scenario, and NR-SS/PBCH block consisting of both LTE NR-PSS/SSS/PBCH and their enhancement NR-ePSS/eSSS/ePBCH is utilized for standalone scenario.

Another design consideration for the enhanced NR-SS/PBCH block is the mapping method impacted by possible LBT and/or possible additional transmission of enhanced NR-PSS/SSS/PBCH and/or transmission of control channels and/or reserved as empty (e.g. due to AGC issue or reserved for CORESET). For LTE NR-SS/PBCH block, NR-PSS/SSS/PBCH are mapped to 4 consecutive symbols. For enhanced NR-SS/PBCH block, due to possible introduction of enhanced NR-PSS/SSS/PBCH, one enhanced NR-SS/PBCH block may occupy more symbols compared to LTE NR-SS/PBCH block. In addition, due to the potential LBT between neighboring transmission of the enhanced NR-SS/PBCH blocks (e.g. if considering the utilization scenario of unlicensed spectrum), and reserving possible locations for CORESET or control signals, the mapping of enhanced NR-SS/PBCH block to slot may be different from LTE NR-SS/PBCH block (e.g. mapped to non-consecutive symbols or mapped in different order comparing to LTE NR-SS/PBCH block).

In one embodiment, it is always beneficial to design the enhanced NR-SS/PBCH block compositied from consecutive symbols. For example, if considering the utilization scenario of unlicensed spectrum, there is no requirement for LBT within the enhanced NR-SS/PBCH block.

In another embodiment, if taking into account the reservation for CORESET or control channels and coexistence issue of multiple numerologies, it may also be likely that the enhanced NR-SS/PBCH block consists of non-consecutive symbols. In one example, if considering the utilization scenario of unlicensed spectrum, the gap between symbol groups within an enhanced NR-SS/PBCH block is shorter than the maximum gap without performing LBT (e.g. 16 us for 5 GHz, or 8 us for 60 GHz), such that no LBT is needed in the gap within the enhanced NR-SS/PBCH block. In another example, if considering the utilization scenario of unlicensed spectrum, the gap between symbol groups within an enhanced NR-SS/PBCH block is longer than the maximum gap without performing LBT (e.g. 16 us for 5 GHz, or 8 us for 60 GHz), then LBT is required in the gap within the enhanced NR-SS/PBCH block to proceed transmission.

In yet another embodiment, due to possible gaps within the enhanced NR-SS/PBCH blocks, the design across different enhanced NR-SS/PBCH blocks may not be same. For example, although the components of the enhanced NR-SS/PBCH blocks (e.g. signals/channels within an enhanced NR-SS/PBCH block) are the same, the gap location within the enhanced NR-SS/PBCH block can be different for different the enhanced NR-SS/PBCH blocks.

In general, an enhanced NR-SS/PBCH block can composite of 0-1 symbol mapped for NR-PSS, 0-1 symbol mapped for NR-SSS (wherein within each symbol the enhanced NR-SS/PBCH block may be FDMed with NR-PBCH or NR-ePBCH), 0-2 symbols mapped for NR-ePSS, 0-2 symbols mapped for NR-eSSS (wherein within each symbol the enhanced NR-SS/PBCH block may be FDMed with NR-PBCH or NR-ePBCH), 0-2 symbols fully mapped for NR-PBCH (including enhanced NR-SS/PBCH block's DMRS) or 0-8 symbols fully mapped for NR-ePBCH (including enhanced NR-SS/PBCH block's DMRS), as well as 0-G symbols for gap (G is an integer).

The particular number of symbols for each signal/channel/gap can be determined from application scenarios (e.g. utilization scenarios including at least one of unlicensed spectrum/V2X sidelink/URLLC/MTC/IoT, and/or carrier frequency range, and/or standalone/non-standalone). Examples of enhanced NR-SS/PBCH block composition/mapping/multiplexing are illustrated as in FIG. 13 to FIG. 19, corresponding to the enhanced NR-SS/PBCH block with 2 to 8 symbols (symbols for gap not counted) respectively, and more examples of enhanced NR-SS/PBCH block composition/mapping/multiplexing are illustrated as in FIG. 20, corresponding to the enhanced NR-SS/PBCH block with 14 symbols (i.e, a slot, including potential empty symbols reserved), wherein the above design considerations have been taken into account.

In one embodiment, all signals and/or channels in the enhanced NR-SS/PBCH block are transmitted using the same antenna port. Note that FIG. 13 to FIG. 20 may not be an exclusive illustration of all supported designs covered by this disclosure.

Note that if a wider BW can be supported for enhanced NR-SS/PBCH block, the BW of each signal/channel in the figures is enlarged accordingly. For example, if the BW of enhanced NR-SS/PBCH block is 40 PRBs, the BW of 20 PRBs in the figures can be replaced by 40 PRBs and/or 12 PRBs can be replaced by 24 PRBs, without change of the time-domain multiplexing pattern.

Note that if a smaller BW is supported for enhanced NR-SS/PBCH block, the BW of each signal/channel in the figures is truncated to the central PRBs corresponding to the supported BW of the enhanced NR-SS/PBCH block. For example, if the BW of enhanced NR-SS/PBCH block is 12 PRBs, all the signals/channels in the figures are truncated to the central 12 PRBs such that there is no FDMed NR-PBCH or NR-ePBCH with NR-SSS or NR-eSSS in the figures.

Note that the symbols or part of symbols mapped for NR-PBCH/NR-ePBCH in the figures can contain the DMRS of NR-PBCH/NR-ePBCH as well, wherein the REs for DMRS can be IFDMed with REs for NR-PBCH/NR-ePBCH in one embodiment, or can be TDMed with REs for NR-PBCH/NR-ePBCH in another embodiment.

Figure 13A:
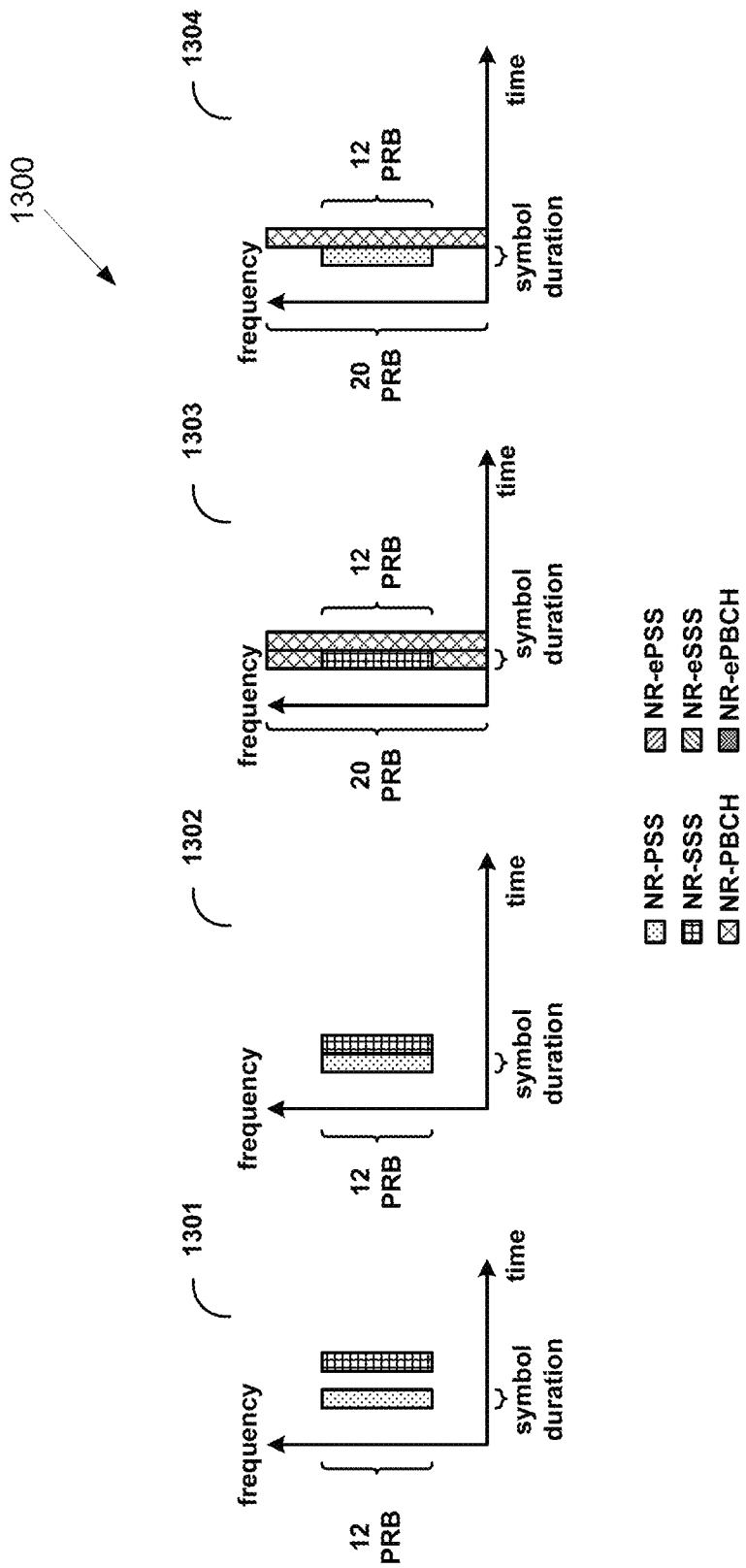
FIG. 13A illustrates an example NR-SS/PBCH block composition/mapping/multiplexing according to embodiments of the present disclosure.

FIG. 13A illustrates an example NR-SS/PBCH block composition/mapping/multiplexing 1300 according to embodiments of the present disclosure. The embodiment of the NR-SS/PBCH block composition/mapping/multiplexing 1300 illustrated in FIG. 13A is for illustration only. FIG. 13A does not limit the scope of this disclosure to any particular implementation.

In one example of 1301 in FIG. 13A, enhanced NR-SS/PBCH block only contains NR-PSS and NR-SSS, and is TDMed and mapped to non-consecutive symbols (e.g. the same mapping as LTE NR-SS/PBCH block, i.e., NR-PSS mapped to #0 and NR-SSS mapped to #2 symbol within the NR-SS/PBCH block). In one embodiment, this example can be utilized for non-standalone unlicensed spectrum (e.g. for measurement purpose).

A possible variant of this example is the mapping order of NR-PSS and NR-SSS within the SS block, e.g. NR-SSS mapped to #0 and NR-PSS mapped to #2 symbol within the NR-SS/PBCH block.

Another possible variant of this example is the size of the gap between NR-PSS and NR-SSS (i.e., the gap can be larger than one symbol). For instance, if the gap is K symbols, NR-SSS is mapped to #0 and NR-PSS mapped to #K+1 symbol within the SS block. For another instance, if the gap is K symbols, NR-PSS is mapped to #0 and NR-SSS mapped to #K+1 symbol within the NR-SS/PBCH block.

In one example of 1302 in FIG. 13A, enhanced NR-SS/PBCH block only contains NR-PSS and NR-SSS, and is TDMed and mapped to consecutive symbols (e.g. NR-PSS mapped to #0 and NR-SSS mapped to #1 symbol within the NR-SS/PBCH block). In one embodiment, this example can be utilized for non-standalone unlicensed spectrum (e.g. for measurement purpose).

A possible variant of this example is the mapping order of NR-PSS and NR-SSS within the NR-SS/PBCH block, e.g. NR-SSS mapped to #0 and NR-PSS mapped to #1 symbol within the NR-SS/PBCH block.

In one example of 1303 in FIG. 13A, enhanced NR-SS/PBCH block only contains NR-SSS/NR-PBCH and NR-PBCH, and is FDMed and TDMed and mapped to consecutive symbols (e.g. NR-SSS/NR-PBCH mapped to #0 and NR-PBCH mapped to #1 symbol within the NR-SS/PBCH block). In one embodiment, this example can be utilized for non-standalone unlicensed spectrum (e.g. for measurement purpose).

A possible variant of this example is the mapping order of NR-SSS/NR-PBCH and NR-PBCH within the NR-SS/PBCH block, e.g. NR-PBCH mapped to #0 and NR-SSS/NR-PBCH mapped to #1 symbol within the SS block.

In one example of 1304 in FIG. 13A, enhanced NR-SS/PBCH block only contains NR-PSS and NR-PBCH, and is TDMed and mapped to consecutive symbols (e.g. NR-PSS mapped to #0 and NR-PBCH mapped to #1 symbol within the NR-SS/PBCH block). In one embodiment, this example can be utilized for non-standalone unlicensed spectrum (e.g. for measurement purpose).

A possible variant of this example is the mapping order of NR-PSS and NR-PBCH within the NR-SS/PBCH block, e.g. NR-PBCH mapped to #0 and NR-PSS mapped to #1 symbol within the NR-SS/PBCH block.

Figure 13B:
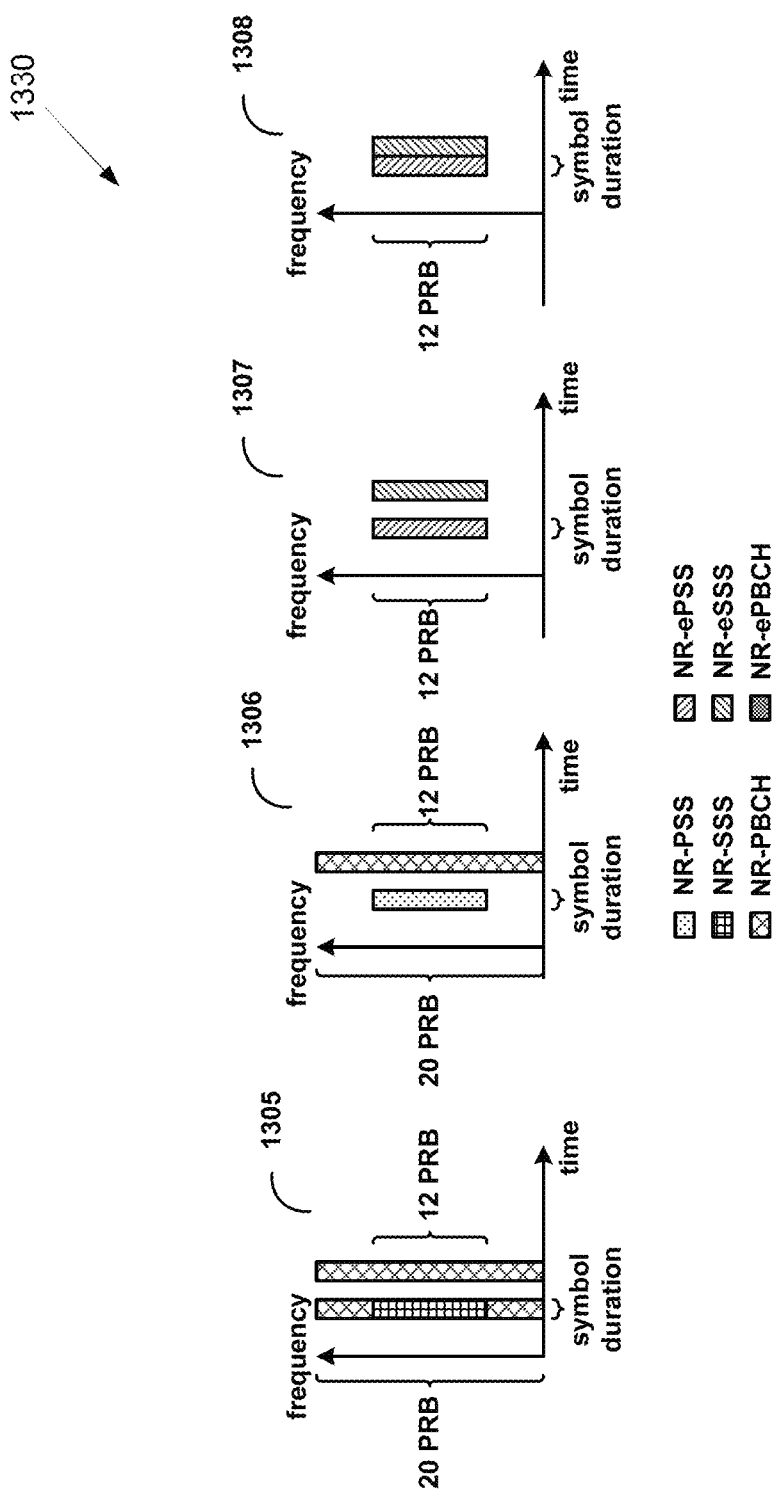
FIG. 13B illustrates another example NR-SS/PBCH block composition/mapping/multiplexing according to embodiments of the present disclosure.

FIG. 13B illustrates another example NR-SS/PBCH block composition/mapping/multiplexing 1330 according to embodiments of the present disclosure. The embodiment of the NR-SS/PBCH block composition/mapping/multiplexing 1330 illustrated in FIG. 13B is for illustration only. FIG. 13B does not limit the scope of this disclosure to any particular implementation.

In one example of 1305 in FIG. 13B, enhanced NR-SS/PBCH block only contains NR-SSS and NR-PBCH, and is FDMed and TDMed and mapped to non-consecutive symbols (e.g. NR-SSS/NR-PBCH mapped to #0 and NR-PBCH mapped to #2 symbol within the NR-SS/PBCH block). In one embodiment, this example can be utilized for non-standalone unlicensed spectrum (e.g. for measurement purpose).

A possible variant of this example is the mapping order of NR-SSS/NR-PBCH and NR-PBCH within the NR-SS/PBCH block, e.g. NR-PBCH mapped to #0 and NR-SSS/NR-PBCH mapped to #2 symbol within the NR-SS/PBCH block.

Another possible variant of this example is the size of the gap between NR-SSS/NR-PBCH and NR-PBCH (i.e., the gap can be larger than one symbol). For instance, if the gap is K symbols, NR-SSS is mapped to #0 and NR-PBCH mapped to #K+1 symbol within the NR-SS/PBCH block. For another instance, if the gap is K symbols, NR-PBCH is mapped to #0 and NR-SSS/NR-PBCH mapped to #K+1 symbol within the NR-SS/PBCH block.

In one example of 1306 in FIG. 13B, enhanced NR-SS/PBCH block only contains NR-PSS and NR-PBCH, and is TDMed and mapped to non-consecutive symbols (e.g. NR-PSS mapped to #0 and NR-PBCH mapped to #2 symbol within the NR-SS/PBCH block). In one embodiment, this example can be utilized for non-standalone unlicensed spectrum (e.g. for measurement purpose).

A possible variant of this example is the mapping order of NR-PSS and NR-PBCH within the NR-SS/PBCH block, e.g. NR-PBCH mapped to #0 and NR-PSS mapped to #2 symbol within the NR-SS/PBCH block.

Another possible variant of this example is the size of the gap between NR-PSS and NR-PBCH (i.e., the gap can be larger than one symbol). For instance, if the gap is K symbols, NR-PSS is mapped to #0 and NR-PBCH mapped to #K+1 symbol within the NR-SS/PBCH block. For another instance, if the gap is K symbols, NR-PBCH is mapped to #0 and NR-PSS mapped to #K+1 symbol within the NR-SS/PBCH block.

In one example of 1307 in FIG. 13B, enhanced NR-SS/PBCH block only contains NR-ePSS and NR-eSSS, and is TDMed and mapped to non-consecutive symbols (e.g. NR-ePSS mapped to #0 and NR-eSSS mapped to #2 symbol within the NR-SS/PBCH block). In one embodiment, this example can be utilized for non-standalone unlicensed spectrum (e.g. for measurement purpose).

A possible variant of this example is the mapping order of NR-ePSS and NR-eSSS within the NR-SS/PBCH block, e.g. NR-eSSS mapped to #0 and NR-ePSS mapped to #2 symbol within the NR-SS/PBCH block.

Another possible variant of this example is the size of the gap between NR-ePSS and NR-eSSS (i.e., the gap can be larger than one symbol). For instance, if the gap is K symbols, NR-eSSS is mapped to #0 and NR-ePSS mapped to #K+1 symbol within the NR-SS/PBCH block. For another instance, if the gap is K symbols, NR-ePSS is mapped to #0 and NR-eSSS mapped to #K+1 symbol within the NR-SS/PBCH block.

Another possible variant of this example is NR-ePSS and/or NR-eSSS have wider bandwidth than NR-PSS and NR-SSS (e.g. NR-ePSS and/or NR-eSSS occupy 20 PRBs or 24 PRBs). Note that this variant can be combined with previous variants on the mapping order and gap size.

In one example of 1308 in FIG. 13B, enhanced NR-SS/PBCH block only contains NR-ePSS and NR-eSSS, and is TDMed and mapped to consecutive symbols (e.g. NR-ePSS mapped to #0 and NR-eSSS mapped to #1 symbol within the NR-SS/PBCH block). In one embodiment, this example can be utilized for non-standalone unlicensed spectrum (e.g. for measurement purpose).

A possible variant of this example is the mapping order of NR-ePSS and NR-eSSS within the NR-SS/PBCH block, e.g. NR-eSSS mapped to #0 and NR-ePSS mapped to #1 symbol within the NR-SS/PBCH block.

Another possible variant of this example is NR-ePSS and/or NR-eSSS have wider bandwidth than NR-PSS and NR-SSS (e.g. NR-ePSS and/or NR-eSSS occupy 20 PRBs or 24 PRBs). Note that this variant can be combined with previous variant on the mapping order.

Figure 13C:
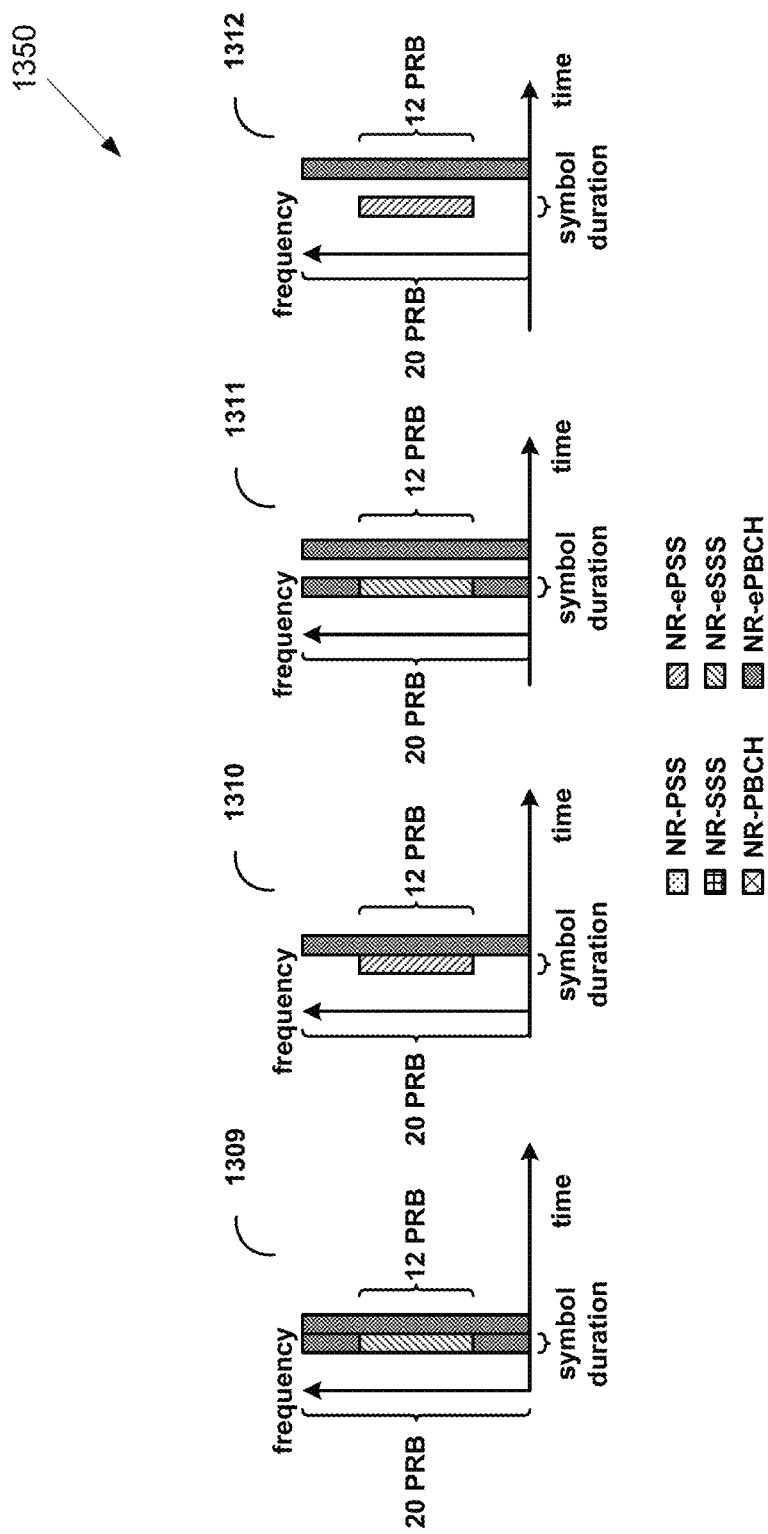
FIG. 13C illustrates yet another example NR-SS/PBCH block composition/mapping/multiplexing according to embodiments of the present disclosure.

FIG. 13C illustrates yet another example NR-SS/PBCH block composition/mapping/multiplexing 1350 according to embodiments of the present disclosure. The embodiment of the NR-SS/PBCH block composition/mapping/multiplexing 1350 illustrated in FIG. 13C is for illustration only. FIG. 13C does not limit the scope of this disclosure to any particular implementation.

In one example of 1309 in FIG. 13C, enhanced NR-SS/PBCH block only contains NR-eSSS and NR-ePBCH, and is FDMed and TDMed and mapped to consecutive symbols (e.g. NR-eSSS/NR-ePBCH mapped to #0 and NR-ePBCH mapped to #1 symbol within the NR-SS/PBCH block). In one embodiment, this example can be utilized for non-standalone unlicensed spectrum (e.g. for measurement purpose).

A possible variant of this example is the mapping order of NR-eSSS/NR-ePBCH and NR-ePBCH within the NR-SS/PBCH block, e.g. NR-ePBCH mapped to #0 and NR-eSSS/NR-ePBCH mapped to #1 symbol within the NR-SS/PBCH block.

Another possible variant of this example is NR-eSSS have wider bandwidth than NR-PSS and NR-SSS (e.g. NR-eSSS occupies 20 PRBs or 24 PRBs). Note that this variant can be combined with previous variant on the mapping order.

In one example of 1310 in FIG. 13C, enhanced NR-SS/PBCH block only contains NR-ePSS and NR-ePBCH, and is TDMed and mapped to consecutive symbols (e.g. NR-ePSS mapped to #0 and NR-ePBCH mapped to #1 symbol within the NR-SS/PBCH block). In one embodiment, this example can be utilized for non-standalone unlicensed spectrum (e.g. for measurement purpose).

A possible variant of this example is the mapping order of NR-ePSS and NR-ePBCH within the NR-SS/PBCH block, e.g. NR-ePBCH mapped to #0 and NR-ePSS mapped to #1 symbol within the NR-SS/PBCH block.

Another possible variant of this example is NR-ePSS have wider bandwidth than NR-PSS and NR-SSS (e.g. NR-ePSS occupies 20 PRBs). Note that this variant can be combined with previous variant on the mapping order.

In one example of 1311 in FIG. 13C, enhanced NR-SS/PBCH block only contains NR-eSSS and NR-ePBCH, and is FDMed and TDMed and mapped to non-consecutive symbols (e.g. NR-eSSS/NR-ePBCH mapped to #0 and NR-ePBCH mapped to #2 symbol within the NR-SS/PBCH block). In one embodiment, this example can be utilized for non-standalone unlicensed spectrum (e.g. for measurement purpose).

A possible variant of this example is the mapping order of NR-eSSS/NR-ePBCH and NR-ePBCH within the SS block, e.g. NR-ePBCH mapped to #0 and NR-eSSS/NR-ePBCH mapped to #2 symbol within the NR-SS/PBCH block.

Another possible variant of this example is the size of the gap between NR-eSSS and NR-ePBCH (i.e., the gap can be larger than one symbol). For instance, if the gap is K symbols, NR-eSSS is mapped to #0 and NR-ePBCH mapped to #K+1 symbol within the NR-SS/PBCH block.

For another instance, if the gap is K symbols, NR-ePBCH is mapped to #0 and NR-eSSS mapped to #K+1 symbol within the NR-SS/PBCH block.

Another possible variant of this example is NR-eSSS have wider bandwidth than NR-PSS and NR-SSS (e.g. NR-eSSS occupy 20 PRBs). Note that this variant can be combined with previous variants on the mapping order and gap size.

In one example of 1312 in FIG. 13C, enhanced NR-SS/PBCH block only contains NR-ePSS and NR-ePBCH, and is TDMed and mapped to non-consecutive symbols (e.g. NR-ePSS mapped to #0 and NR-ePBCH mapped to #2 symbol within the NR-SS/PBCH block). In one embodiment, this example can be utilized for non-standalone unlicensed spectrum (e.g. for measurement purpose).

A possible variant of this example is the mapping order of NR-ePSS and NR-ePBCH within the NR-SS/PBCH block, e.g. NR-ePBCH mapped to #0 and NR-ePSS mapped to #2 symbol within the NR-SS/PBCH block.

Another possible variant of this example is the size of the gap between NR-ePSS and NR-ePBCH (i.e., the gap can be larger than one symbol). For instance, if the gap is K symbols, NR-ePSS is mapped to #0 and NR-ePBCH mapped to #K+1 symbol within the NR-SS/PBCH block. For another instance, if the gap is K symbols, NR-ePBCH is mapped to #0 and NR-ePSS mapped to #K+1 symbol within the NR-SS/PBCH block.

Another possible variant of this example is NR-ePSS have wider bandwidth than NR-PSS and NR-SSS (e.g. NR-ePSS occupy 20 PRBs). Note that this variant can be combined with previous variants on the mapping order and gap size.

Figure 14:
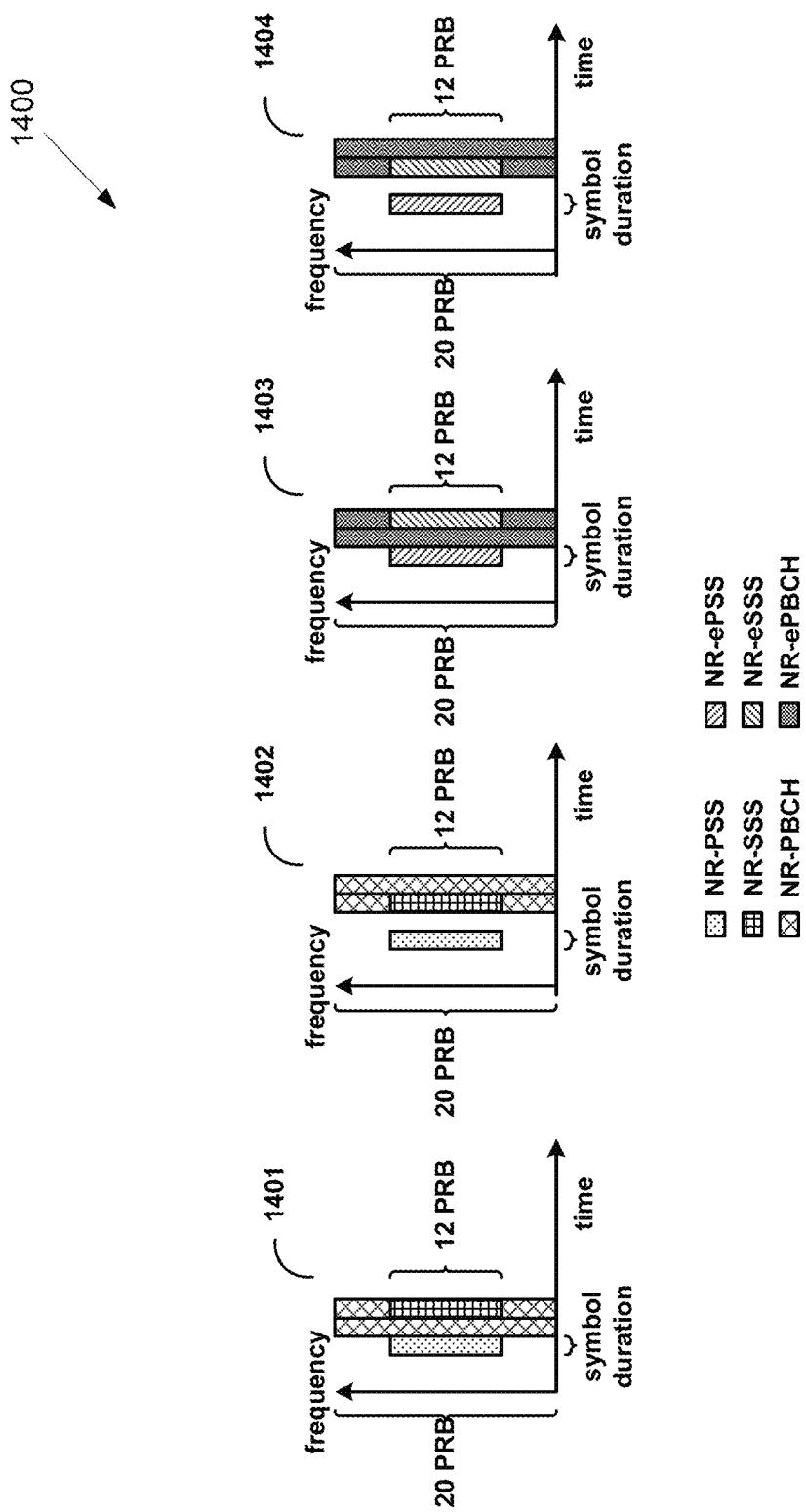
FIG. 14 illustrates yet another example NR-SS/PBCH block composition/mapping/multiplexing according to embodiments of the present disclosure.

FIG. 14 illustrates yet another example NR-SS/PBCH block composition/mapping/multiplexing 1400 according to embodiments of the present disclosure. The embodiment of the NR-SS/PBCH block composition/mapping/multiplexing 1400 illustrated in FIG. 14 is for illustration only. FIG. 14 does not limit the scope of this disclosure to any particular implementation.

In one example of 1401 in FIG. 14, enhanced NR-SS/PBCH block contains NR-PSS, NR-SSS, and NR-PBCH, and is TDMed (NR-SSS and NR-PBCH can be FDMed within a symbol) and mapped to consecutive symbols (e.g. NR-PSS mapped to #0, NR-PBCH mapped to #1, and NR-SSS/NR-PBCH mapped to #2 symbol within the NR-SS/PBCH block).

In one example of 1402 in FIG. 14, enhanced NR-SS/PBCH block contains NR-PSS, NR-SSS, and NR-PBCH, and is TDMed (NR-SSS and NR-PBCH can be FDMed within a symbol) and mapped to non-consecutive symbols, where the first group/sub-block (symbols before the gap) has k symbols, and the second group/sub-block (symbols after the gap) has 3-k symbols, wherein k can be either 1 or 2, and there can be a gap of K symbols within the NR-SS/PBCH block, wherein K is an integer and K≥1 (e.g. k=1 and K=1 in 1002).

In one example of 1403 in FIG. 14, enhanced NR-SS/PBCH block contains NR-ePSS, NR-eSSS, and NR-ePBCH, and is TDMed (NR-eSSS and NR-ePBCH can be FDMed within a symbol) and mapped to consecutive symbols (e.g. NR-ePSS mapped to #0, NR-ePBCH mapped to #1, and NR-eSSS/NR-ePBCH mapped to #2 symbol within the NR-SS/PBCH block).

Another possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1404 in FIG. 14, enhanced NR-SS/PBCH block contains NR-ePSS, NR-eSSS, and NR-ePBCH, and is TDMed (NR-eSSS and NR-ePBCH can be FDMed within a symbol) and mapped to non-consecutive symbols, where the first group/sub-block (symbols before the gap) has k symbols, and the second group/sub-block (symbols after the gap) has 3-k symbols, wherein k can be either 1 or 2, and there can be a gap of K symbols within the NR-SS/PBCH block, wherein K is an integer and K≥1 (e.g. k=1 and K=1 in 1004).

Another possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Figure 15:
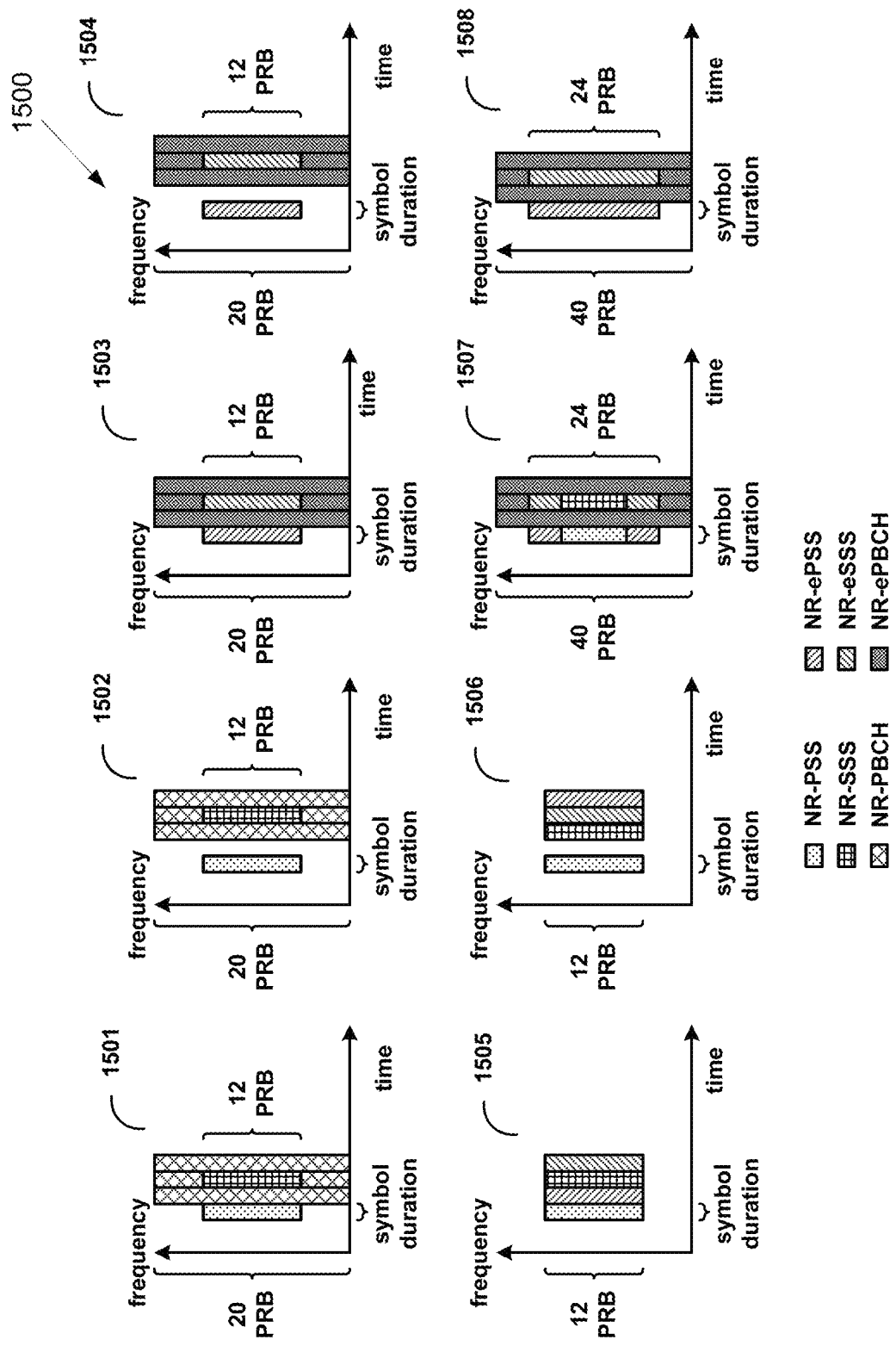
FIG. 15 illustrates yet another example NR-SS/PBCH block composition/mapping/multiplexing according to embodiments of the present disclosure.

FIG. 15 illustrates yet another example NR-SS/PBCH block composition/mapping/multiplexing 1500 according to embodiments of the present disclosure. The embodiment of the NR-SS/PBCH block composition/mapping/multiplexing 1500 illustrated in FIG. 15 is for illustration only. FIG. 15 does not limit the scope of this disclosure to any particular implementation.

In one example of 1501 in FIG. 15, enhanced NR-SS/PBCH block contains NR-PSS, NR-SSS, and NR-PBCH, and is TDMed (NR-SSS and NR-PBCH can be FDMed within a symbol) and mapped to consecutive symbols (e.g. same mapping as LTE NR-SS/PBCH block, i.e., NR-PSS mapped to #0, NR-PBCH mapped to #1 and #3, and NR-SSS/NR-PBCH mapped to #2 symbol within the NR-SS/PBCH block, which is defined as Pattern Order 1).

A possible variant of this example is the mapping order of NR-PSS, NR-SSS, and NR-PBCH within the NR-SS/PBCH block, e.g. NR-PSS mapped to #2, NR-PBCH mapped to #1 and #3, and NR-SSS/NR-PBCH mapped to #0 symbol within the SS block, which is defined as Pattern Order 2.

In one embodiment, two mapping orders (e.g. Mapping Order 1 and 2) can be both supported, and two mapping orders are used in NR licensed and unlicensed bands, correspondingly (UE can detect the relative location of NR-PSS and NR-SSS to distinguish the bands).

In one example of 1502 in FIG. 15, enhanced NR-SS/PBCH block contains NR-PSS, NR-SSS, and NR-PBCH, and is TDMed (NR-SSS and NR-PBCH can be FDMed within a symbol) and mapped to non-consecutive symbols, where the first group/sub-block (symbols before the gap) has k symbols (wherein k can be 1, 2, or 3), and the second group/sub-block (symbols after the gap) has 4-k symbols, and the gap can have K symbols (wherein K is an integer and K≥1). E.g. k=1 and K=1 in 1502.

In one example of 1503 in FIG. 15, enhanced NR-SS/PBCH block contains NR-ePSS, NR-eSSS, and NR-ePBCH, and is TDMed (NR-eSSS and NR-ePBCH can be FDMed within a symbol) and mapped to consecutive symbols (e.g. NR-ePSS mapped to #0, NR-ePBCH mapped to #1 and #3, and NR-eSSS/NR-ePBCH mapped to #2 symbol within the NR-SS/PBCH block).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1504 in FIG. 15, enhanced NR-SS/PBCH block contains NR-ePSS, NR-eSSS, and NR-ePBCH, and is TDMed (NR-eSSS and NR-ePBCH can be FDMed within a symbol) and mapped to non-consecutive symbols, where the first group/sub-block (symbols before the gap) has k symbols (wherein k can be 1, 2, or 3), and the second group/sub-block (symbols after the gap) has 4-k symbols, and the gap can have K symbols (wherein K is an integer and K≥1). E.g. k=1 and K=1 in 1504.

In one example of 1505 in FIG. 15, enhanced NR-SS/PBCH block contains NR-PSS, NR-SSS, NR-ePSS and NR-eSSS, and is TDMed and mapped to consecutive symbols (e.g. NR-PSS mapped to #0, NR-ePSS mapped to #1, NR-SSS mapped to #2, and NR-eSSS mapped to #3 symbol within the NR-SS/PBCH block).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1506 in FIG. 15, enhanced NR-SS/PBCH block contains NR-PSS, NR-SSS, NR-ePSS, and NR-eSSS, and is TDMed and mapped to non-consecutive symbols, where the first group/sub-block (symbols before the gap) has k symbols (wherein k can be 1, 2, or 3), and the second group/sub-block (symbols after the gap) has 4-k symbols, and the gap can have K symbols (wherein K is an integer and K≥1). E.g. k=1 and K=1 in 1506.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1507 in FIG. 15, enhanced NR-SS/PBCH block contains NR-PSS, NR-SSS, NR-ePSS, NR-eSSS, and NR-ePBCH, and NR-PSS and NR-ePSS are FDMed, NR-SSS, NR-eSSS and partial NR-ePBCH are FDMed, and then TDMed with the remaining 2 symbols for NR-ePBCH, and mapped to consecutive symbols (e.g. NR-PSS/NR-ePSS mapped to #0, NR-SSS/NR-eSSS/NR-PBCH mapped to #2, and NR-ePBCH mapped to #1 and #3 symbol within the NR-SS/PBCH block).

In one example of 1508 in FIG. 15, enhanced NR-SS/PBCH block contains NR-ePSS, NR-eSSS, and NR-ePBCH, and is TDMed (NR-eSSS and NR-ePBCH can be FDMed within a symbol) and mapped to consecutive symbols (e.g. NR-ePSS mapped to #0, NR-eSSS/NR-PBCH mapped to #2, and NR-ePBCH mapped to #1 and #3 symbol within the NR-SS/PBCH block).

Figure 16A:
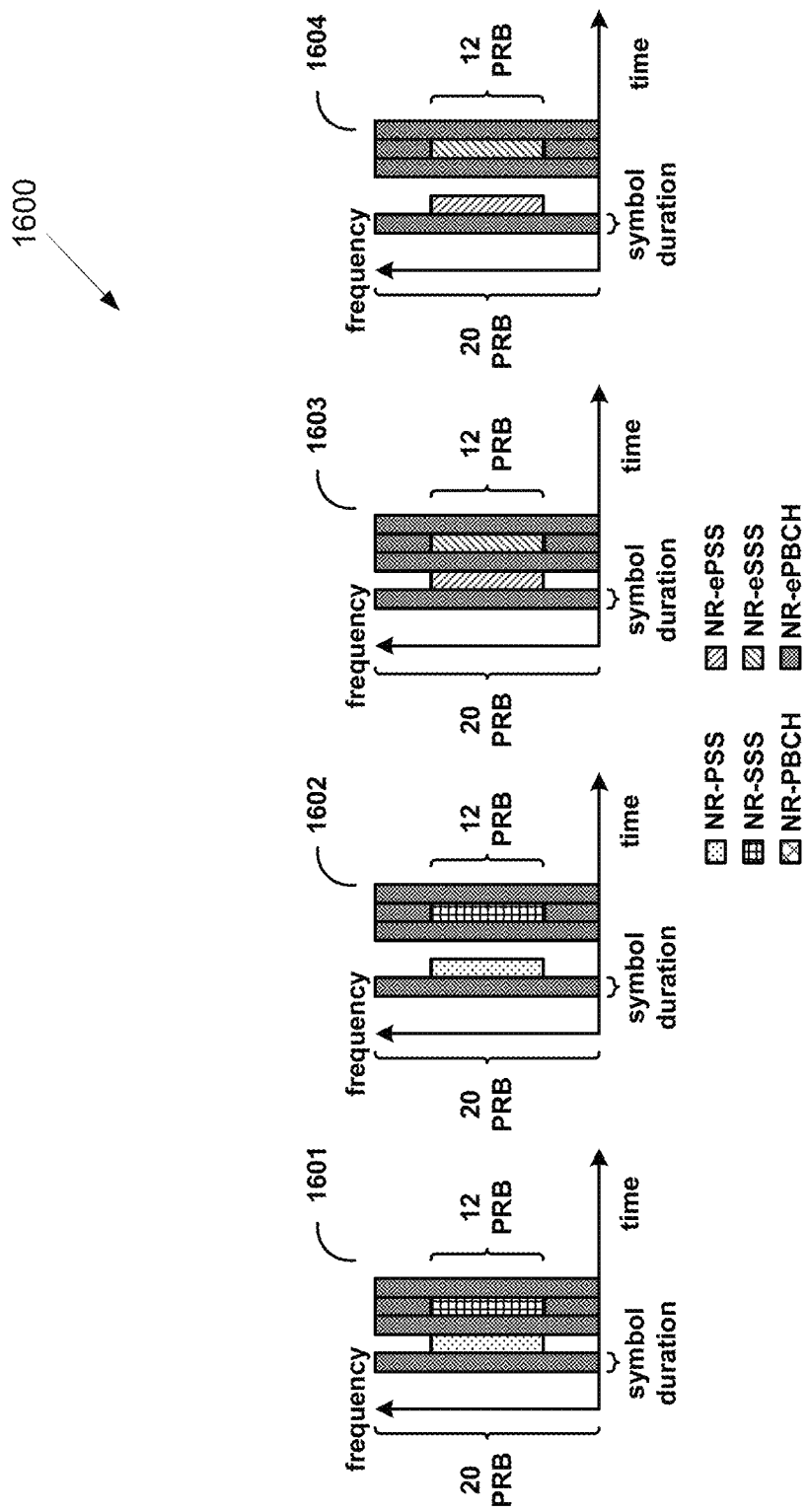
FIG. 16A illustrates yet another example NR-SS/PBCH block composition/mapping/multiplexing according to embodiments of the present disclosure.

FIG. 16A illustrates yet another example NR-SS/PBCH block composition/mapping/multiplexing 1600 according to embodiments of the present disclosure. The embodiment of the NR-SS/PBCH block composition/mapping/multiplexing 1600 illustrated in FIG. 16A is for illustration only. FIG. 16A does not limit the scope of this disclosure to any particular implementation.

In one example of 1601 in FIG. 16A, enhanced NR-SS/PBCH block contains NR-PSS, NR-SSS, and NR-ePBCH, and is TDMed (NR-SSS and NR-ePBCH can be FDMed within a symbol) and mapped to consecutive symbols (e.g. NR-PSS mapped to #1, NR-ePBCH mapped to #0, #2, and #4, and NR-SSS/NR-ePBCH mapped to #3 symbol within the enhanced NR-SS/PBCH block as in the figure).

In one embodiment, the mapping order of NR-PSS, NR-SSS, and NR-ePBCH follows the same way as NR-PSS, NR-SSS, and NR-PBCH in LTE NR-SS/PBCH block, and add an extra symbol in the beginning as NR-ePBCH used for avoiding AGC issue.

In another embodiment, the mapping order of NR-PSS, NR-SSS, and NR-ePBCH follows the same way as NR-PSS, NR-SSS, and NR-PBCH in LTE NR-SS/PBCH block, and add an extra symbol in the end as NR-ePBCH, such that NR-SSS is still close to NR-ePBCH symbols such that it can be assumed as one DM-RS of NR-ePBCH (e.g. NR-PSS mapped to #0, NR-ePBCH mapped to #1, #3, and #4, and NR-SSS/NR-ePBCH mapped to #2 symbol within the enhanced NR-SS/PBCH block).

In one example of 1602 in FIG. 16A, enhanced NR-SS/PBCH block contains NR-PSS, NR-SSS, and NR-ePBCH, and is TDMed (NR-SSS and NR-ePBCH can be FDMed within a symbol) and mapped to non-consecutive symbols, where the first group/sub-block (symbols before the gap) has k symbols (wherein k can be 1, 2, 3, or 4), and the second group/sub-block (symbols after the gap) has 5-k symbols, and the gap can have K symbols (wherein K is an integer and K≥1). E.g. k=2 and K=1 in 1602.

In one embodiment, the mapping order of NR-PSS, NR-SSS, and NR-ePBCH follows the same way as NR-PSS, NR-SSS, and NR-PBCH in LTE NR-SS/PBCH block, and add an extra symbol in the beginning as NR-ePBCH used for avoiding AGC issue.

In another embodiment, the mapping order of NR-PSS, NR-SSS, and NR-ePBCH follows the same way as NR-PSS, NR-SSS, and NR-PBCH in LTE NR-SS/PBCH block, and add an extra symbol in the end as NR-ePBCH, such that NR-SSS is still close to NR-ePBCH symbols such that it can be assumed as one DM-RS of NR-ePBCH.

In one example of 1603 in FIG. 16A, enhanced NR-SS/PBCH block contains NR-ePSS, NR-eSSS, and NR-ePBCH, and is TDMed (NR-eSSS and NR-ePBCH can be FDMed within a symbol) and mapped to consecutive symbols (e.g. NR-ePSS mapped to #1, NR-ePBCH mapped to #0, #2, and #4, and NR-eSSS/NR-ePBCH mapped to #3 symbol within the enhanced NR-SS/PBCH block as in the figure).

In one embodiment, the mapping order of NR-ePSS, NR-eSSS, and NR-ePBCH follows the same way as NR-PSS, NR-SSS, and NR-PBCH in LTE NR-SS/PBCH block, and add an extra symbol in the beginning as NR-ePBCH used for avoiding AGC issue.

In another embodiment, the mapping order of NR-ePSS, NR-eSSS, and NR-ePBCH follows the same way as NR-PSS, NR-SSS, and NR-PBCH in LTE NR-SS/PBCH block, and add an extra symbol in the end as NR-ePBCH, such that NR-eSSS is still close to NR-ePBCH symbols such that it can be assumed as one DM-RS of NR-ePBCH (e.g. NR-ePSS mapped to #0, NR-ePBCH mapped to #1, #3, and #4, and NR-eSSS/NR-ePBCH mapped to #2 symbol within the enhanced NR-SS/PBCH block).

In one example of 1604 in FIG. 16A, enhanced NR-SS/PBCH block contains NR-ePSS, NR-eSSS, and NR-ePBCH, and is TDMed (NR-eSSS and NR-ePBCH can be FDMed within a symbol) and mapped to non-consecutive symbols, where the first group/sub-block (symbols before the gap) has k symbols (wherein k can be 1, 2, 3, or 4), and the second group/sub-block (symbols after the gap) has 5-k symbols, and the gap can have K symbols (wherein K is an integer and K≥1). E.g. k=2 and K=1 in 1604.

In one embodiment, the mapping order of NR-ePSS, NR-eSSS, and NR-ePBCH follows the same way as NR-PSS, NR-SSS, and NR-PBCH in LTE NR-SS/PBCH block, and add an extra symbol in the beginning as NR-ePBCH used for avoiding AGC issue.

In another embodiment, the mapping order of NR-ePSS, NR-eSSS, and NR-ePBCH follows the same way as NR-PSS, NR-SSS, and NR-PBCH in LTE NR-SS/PBCH block, and add an extra symbol in the end as NR-ePBCH, such that NR-eSSS is still close to NR-ePBCH symbols such that it can be assumed as one DM-RS of NR-ePBCH.

Figure 16B:
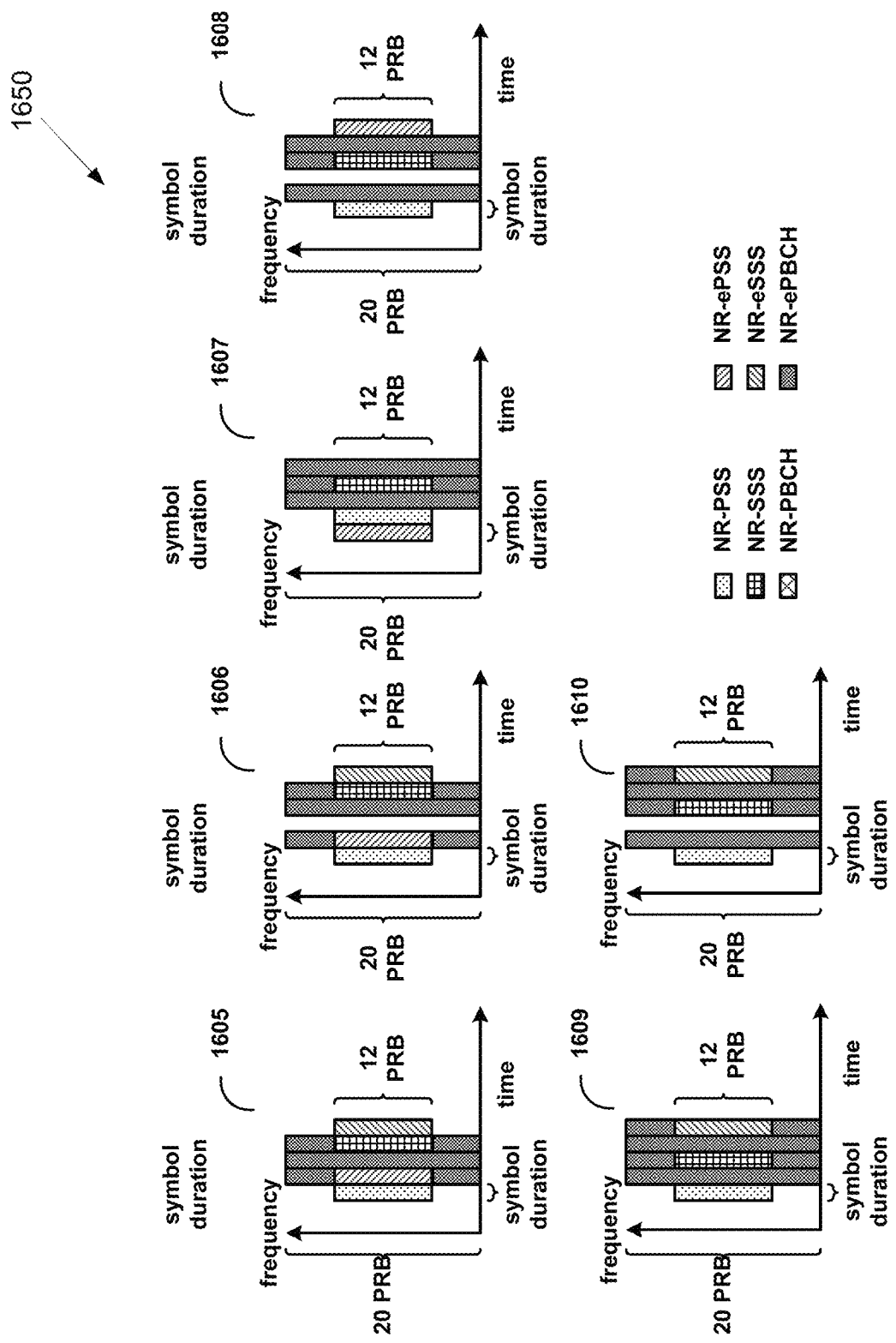
FIG. 16B illustrates yet another example NR-SS/PBCH block composition/mapping/multiplexing according to embodiments of the present disclosure.

FIG. 16B illustrates yet another example NR-SS/PBCH block composition/mapping/multiplexing 1650 according to embodiments of the present disclosure. The embodiment of the NR-SS/PBCH block composition/mapping/multiplexing 1650 illustrated in FIG. 16B is for illustration only. FIG. 16B does not limit the scope of this disclosure to any particular implementation.

In one example of 1605 in FIG. 16B, enhanced NR-SS/PBCH block contains NR-PSS, NR-SSS, NR-ePSS, NR-eSSS, and NR-ePBCH, and is TDMed (NR-SSS and NR-eSSS can be FDMed with NR-ePBCH within a symbol) and mapped to consecutive symbols (e.g. NR-PSS mapped to #0, NR-eSSS/NR-ePBCH mapped to #1, NR-ePBCH mapped to #2, NR-SSS/NR-ePBCH mapped to #3, and NR-ePSS mapped to #4 symbol within the enhanced NR-SS/PBCH block as in the figure).

In one embodiment, the mapping order can be NR-PSS mapped to #0, NR-SSS/NR-ePBCH mapped to #1, NR-ePBCH mapped to #2, NR-eSSS/NR-ePBCH mapped to #3, and NR-ePSS mapped to #4 symbol within the enhanced NR-SS/PBCH block, this mapping order and the one in the 1605 both ensure NR-SSS and NR-eSSS are still close to NR-ePBCH symbols such that NR-SSS and NR-eSSS can be assumed as DM-RS of NR-ePBCH.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1606 in FIG. 16B, enhanced NR-SS/PBCH block contains NR-PSS, NR-SSS, NR-ePSS, NR-eSSS, and NR-ePBCH, and is TDMed (NR-SSS and NR-eSSS can be FDMed with NR-ePBCH within a symbol) and mapped to non-consecutive symbols, where the first group/sub-block (symbols before the gap) has k symbols (wherein k can be 1, 2, 3, or 4), and the second group/sub-block (symbols after the gap) has 5-k symbols, and the gap can have K symbols (wherein K is an integer and K≥1). E.g. k=2 and K=1 in 1606.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1607 in FIG. 16B, enhanced NR-SS/PBCH block contains NR-PSS (1 symbol), NR-SSS (1 partial symbol to be multiplexed with NR-ePBCH), NR-ePSS (1 symbol), and NR-ePBCH (2 full symbols and 1 partial symbol multiplexed with NR-SSS), and is TDMed (NR-SSS can be FDMed with NR-ePBCH within a symbol) and mapped to consecutive symbols (e.g. NR-PSS mapped to #1, NR-SSS/NR-ePBCH mapped to #3, NR-ePBCH mapped to #2 and #4, and NR-ePSS mapped to #0 symbol within the enhanced NR-SS/PBCH block as in the figure, i.e., same mapping order as in LTE NR-SS/PBCH block and add one symbol for NR-ePSS at the beginning.).

In one embodiment, the mapping order can be NR-PSS mapped to #0, NR-SSS/NR-ePBCH mapped to #2, NR-ePBCH mapped to #1 and #3, and NR-ePSS mapped to #4 symbol within the enhanced NR-SS/PBCH block.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1608 in FIG. 16B, enhanced NR-SS/PBCH block contains NR-PSS, NR-SSS, NR-ePSS, and NR-ePBCH, and is TDMed (NR-SSS can be FDMed with NR-ePBCH within a symbol) and mapped to non-consecutive symbols, where the first group/sub-block (symbols before the gap) has k symbols (wherein k can be 1, 2, 3, or 4), and the second group/sub-block (symbols after the gap) has 5-k symbols, and the gap can have K symbols (wherein K is an integer and K≥1). E.g. k=2 and K=1 in 1608.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1609 in FIG. 16B, enhanced NR-SS/PBCH block contains NR-PSS, NR-SSS, NR-eSSS, and NR-ePBCH, and is TDMed (NR-SSS and NR-eSSS can be FDMed with NR-ePBCH within a symbol) and mapped to consecutive symbols (e.g. NR-PSS mapped to #0, NR-SSS/NR-ePBCH mapped to #2, NR-ePBCH mapped to #1 and #3, and NR-eSSS/NR-ePBCH mapped to #4 symbol within the enhanced NR-SS/PBCH block as in the figure).

In one embodiment, the mapping order can be NR-PSS mapped to #1, NR-SSS/NR-ePBCH mapped to #3, NR-ePBCH mapped to #2 and #4, and NR-eSSS/NR-ePBCH mapped to #0 symbol within the enhanced NR-SS/PBCH block, i.e., same mapping order as in LTE NR-SS/PBCH block and add one symbol for NR-eSSS/NR-ePBCH at the beginning.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1610 in FIG. 16B, enhanced NR-SS/PBCH block contains NR-PSS, NR-SSS, NR-eSSS, and NR-ePBCH, and is TDMed (NR-SSS and NR-eSSS can be FDMed with NR-ePBCH within a symbol) and mapped to non-consecutive symbols, where the first group/sub-block (symbols before the gap) has k symbols (wherein k can be 1, 2, 3, or 4), and the second group/sub-block (symbols after the gap) has 5-k symbols, and the gap can have K symbols (wherein K is an integer and K≥1). E.g. k=2 and K=1 in 1610.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Figure 17:
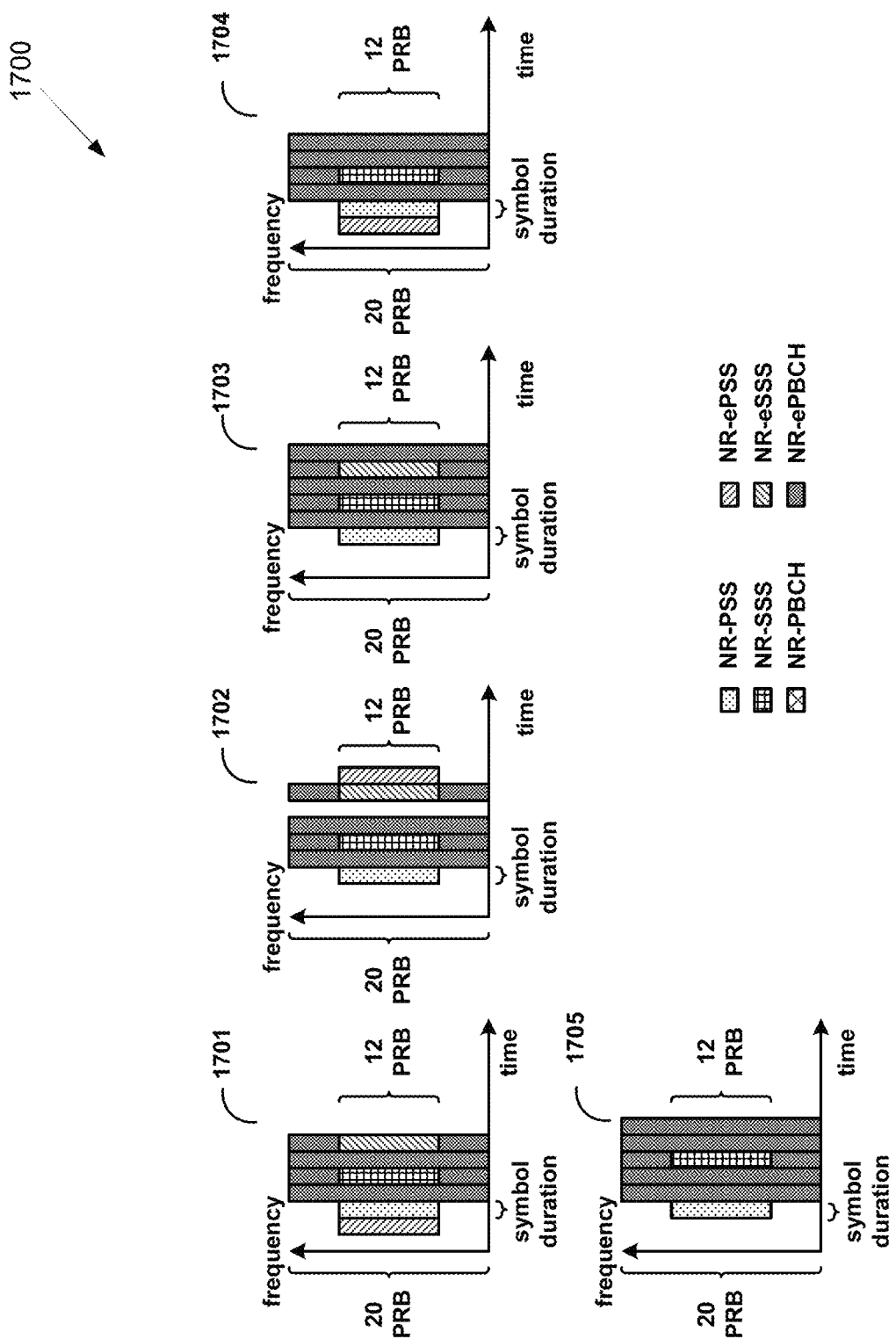
FIG. 17 illustrates yet another example NR-SS/PBCH block composition/mapping/multiplexing according to embodiments of the present disclosure.

FIG. 17 illustrates yet another example NR-SS/PBCH block composition/mapping/multiplexing 1700 according to embodiments of the present disclosure. The embodiment of the NR-SS/PBCH block composition/mapping/multiplexing 1700 illustrated in FIG. 17 is for illustration only. FIG. 17 does not limit the scope of this disclosure to any particular implementation.

In one example of 1701 in FIG. 17, enhanced NR-SS/PBCH block contains NR-PSS (1 symbol), NR-SSS (1 partial symbol to be multiplexed with NR-ePBCH), NR-ePSS (1 symbol), NR-eSSS (1 partial symbol to be multiplexed with NR-ePBCH), and NR-ePBCH (2 full symbols and 2 partial symbols to be multiplexed with NR-eSSS/NR-SSS), and is TDMed (NR-SSS/NR-eSSS can be FDMed with NR-ePBCH within a symbol) and mapped to consecutive symbols (e.g. NR-ePSS mapped to #0, NR-ePBCH mapped to #2, and #4, NR-SSS/NR-ePBCH mapped to #3, NR-eSSS/NR-ePBCH mapped to #5, and NR-PSS mapped to #1 symbol within the enhanced NR-SS/PBCH block as in the figure).

In one embodiment, the mapping order can be NR-PSS mapped to #0, NR-ePBCH mapped to #1, and #3, NR-SSS/NR-ePBCH mapped to #2, NR-eSSS/NR-ePBCH mapped to #5, and NR-ePSS mapped to #4 symbol within the enhanced NR-SS/PBCH block A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1702 in FIG. 17, enhanced NR-SS/PBCH block contains NR-PSS, NR-SSS, NR-ePSS, NR-eSSS, and NR-ePBCH, and is TDMed (NR-SSS and NR-eSSS can be FDMed with NR-ePBCH within a symbol) mapped to non-consecutive symbols, where the first group/sub-block (symbols before the gap) has k symbols (wherein k can be 1, 2, 3, 4 or 5), and the second group/sub-block (symbols after the gap) has 6-k symbols, and the gap can have K symbols (wherein K is an integer and K≥1). E.g. k=4 and K=1 in 1702.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1703 in FIG. 17, enhanced NR-SS/PBCH block contains NR-PSS (1 symbol), NR-SSS (1 partial symbol to be multiplexed with NR-ePBCH), NR-eSSS (1 partial symbol to be multiplexed with NR-ePBCH), and NR-ePBCH (3 full symbols and 2 partial symbols to be multiplexed with NR-eSSS/NR-SSS), and is TDMed (NR-SSS/NR-eSSS can be FDMed with NR-ePBCH within a symbol) and mapped to consecutive symbols (e.g. NR-ePBCH mapped to #1, #3, and #5, NR-SSS/NR-ePBCH mapped to #2, NR-eSSS/NR-ePBCH mapped to #4, and NR-PSS mapped to #0 symbol within the enhanced NR-SS/PBCH block as in the figure).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1704 in FIG. 17, enhanced NR-SS/PBCH block contains NR-PSS (1 symbol), NR-SSS (1 partial symbol to be multiplexed with NR-ePBCH), NR-ePSS (1 symbol), and NR-ePBCH (3 full symbols and 1 partial symbol to be multiplexed with NR-SSS), and is TDMed (NR-SSS can be FDMed with NR-ePBCH within a symbol) and mapped to consecutive symbols (e.g. NR-ePBCH mapped to #2, #4, and #5, NR-SSS/NR-ePBCH mapped to #3, NR-ePSS mapped to #0, and NR-PSS mapped to #1 symbol within the enhanced NR-SS/PBCH block as in the figure).

In one embodiment, the mapping order can be NR-ePBCH mapped to #0, #3, and #5, NR-SSS/NR-ePBCH mapped to #4, NR-ePSS mapped to #1, and NR-PSS mapped to #2 symbol within the enhanced NR-SS/PBCH block.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1705 in FIG. 17, enhanced NR-SS/PBCH block contains NR-PSS (1 symbol), NR-SSS (1 partial symbol to be multiplexed with NR-ePBCH), and NR-ePBCH (4 full symbols and 1 partial symbol to be multiplexed with NR-SSS), and is TDMed (NR-SSS can be FDMed with NR-ePBCH within a symbol) and mapped to consecutive symbols (e.g. NR-ePBCH mapped to #1, #2, #4, and #5, NR-SSS/NR-ePBCH mapped to #3, and NR-PSS mapped to #0 symbol within the enhanced NR-SS/PBCH block as in the figure).

In one embodiment, the mapping order can be NR-ePBCH mapped to #0, #2, #4, and #5, NR-SSS/NR-ePBCH mapped to #3, and NR-PSS mapped to #1 symbol within the enhanced NR-SS/PBCH block.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Figure 18:
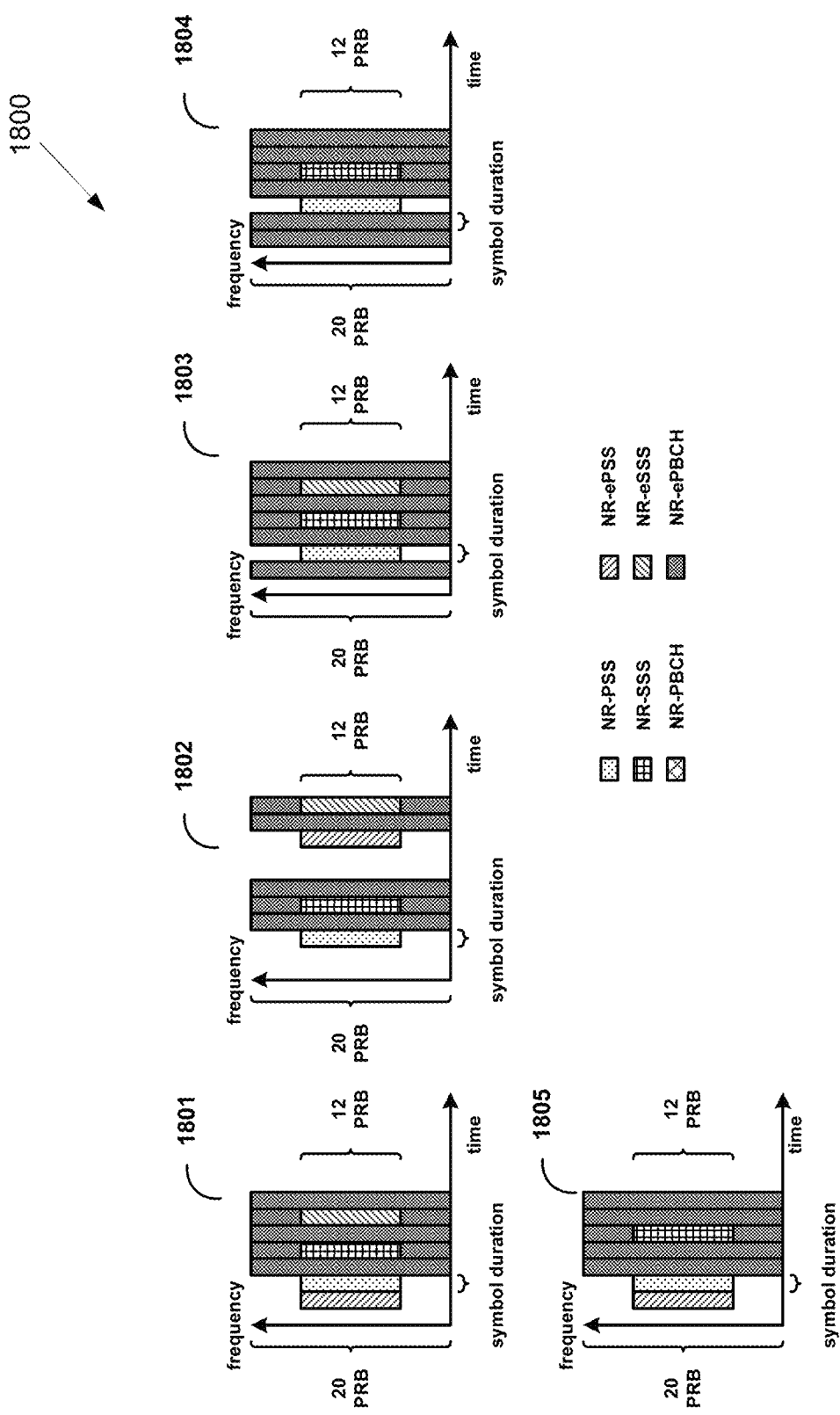
FIG. 18 illustrates yet another example NR-SS/PBCH block composition/mapping/multiplexing according to embodiments of the present disclosure.

FIG. 18 illustrates yet another example NR-SS/PBCH block composition/mapping/multiplexing 1800 according to embodiments of the present disclosure. The embodiment of the NR-SS/PBCH block composition/mapping/multiplexing 1800 illustrated in FIG. 18 is for illustration only. FIG. 18 does not limit the scope of this disclosure to any particular implementation.

In one example of 1801 in FIG. 18, enhanced NR-SS/PBCH block contains NR-PSS (1 symbol), NR-SSS (1 partial symbol to be multiplexed with NR-ePBCH), NR-ePSS (1 symbol), NR-eSSS (1 partial symbol to be multiplexed with NR-ePBCH), and NR-ePBCH (3 full symbols and 2 partial symbols to be multiplexed with NR-SSS/NR-eSSS), and is TDMed (NR-SSS/NR-eSSS can be FDMed with NR-ePBCH within a symbol) and mapped to consecutive symbols (e.g. NR-PSS mapped to #1, NR-ePBCH mapped to #2, #4, and #6, NR-SSS/NR-ePBCH mapped to #3, NR-eSSS/NR-ePBCH mapped to #5, and NR-ePSS mapped to #0 symbol within the enhanced NR-SS/PBCH block as in the figure).

In one embodiment, the mapping order can be NR-PSS mapped to #2, NR-ePBCH mapped to #1, #3, and #5, NR-SSS/NR-ePBCH mapped to #4, NR-eSSS/NR-ePBCH mapped to #6, and NR-ePSS mapped to #0 symbol within the enhanced NR-SS/PBCH block, i.e., keeping the same SS/PBCH block structure as in LTE NR-SS/PBCH block, and add 2 symbol in the front (occupying the reserved symbols for control) and 1 symbol to the end.

In another embodiment, the mapping order can be NR-PSS mapped to #0, NR-ePBCH mapped to #1, #3, and #5, NR-SSS/NR-ePBCH mapped to #2, NR-eSSS/NR-ePBCH mapped to #4, and NR-ePSS mapped to #6 symbol within the enhanced NR-SS/PBCH block.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1802 in FIG. 18, enhanced NR-SS/PBCH block contains NR-PSS, NR-SSS, NR-ePSS, NR-eSSS, and NR-ePBCH, and is TDMed (NR-SSS and NR-eSSS can be FDMed with NR-ePBCH within a symbol) mapped to non-consecutive symbols, where the first group/sub-block (symbols before the gap) has k symbols (wherein k can be 1, 2, 3, 4, 5 or 6), and the second group/sub-block (symbols after the gap) has 7-k symbols, and the gap can have K symbols (wherein K is an integer and K≥1). E.g. k=2 and K=4 in 1802.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1803 in FIG. 18, enhanced NR-SS/PBCH block contains NR-PSS (1 symbol), NR-SSS (1 partial symbol to be multiplexed with NR-ePBCH), NR-eSSS (1 partial symbol to be multiplexed with NR-ePBCH), and NR-ePBCH (4 full symbols and 2 partial symbols to be multiplexed with NR-SSS/NR-eSSS), and is TDMed (NR-SSS/NR-eSSS can be FDMed with NR-ePBCH within a symbol) and mapped to consecutive symbols (e.g. NR-PSS mapped to #1, NR-ePBCH mapped to #0, #2, #4, and #6, NR-SSS/NR-ePBCH mapped to #3, and NR-eSSS/NR-ePBCH mapped to #5 symbol within the enhanced NR-SS/PBCH block as in the figure).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example 1804 in FIG. 18, enhanced NR-SS/PBCH block contains NR-PSS (1 symbol), NR-SSS (1 partial symbol to be multiplexed with NR-ePBCH), and NR-ePBCH (5 full symbols and 2 partial symbols to be multiplexed with NR-SSS), and is TDMed (NR-SSS can be FDMed with NR-ePBCH within a symbol) and mapped to consecutive symbols (e.g. NR-PSS mapped to #2, NR-ePBCH mapped to #0, #1, #3, #5, and #6, and NR-SSS/NR-ePBCH mapped to #4 symbol within the enhanced NR-SS/PBCH block as in the figure).

In one embodiment, the mapping order can be NR-PSS mapped to #0, NR-ePBCH mapped to #1, #2, #4, #5, and #6, and NR-SSS/NR-ePBCH mapped to #3 symbol within the enhanced NR-SS/PBCH block.

In another embodiment, the mapping order can be NR-PSS mapped to #0, NR-ePBCH mapped to #1, #2, #3, #5, and #6, and NR-SSS/NR-ePBCH mapped to #4 symbol within the enhanced NR-SS/PBCH block.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1805 in FIG. 18, enhanced NR-SS/PBCH block contains NR-PSS (1 symbol), NR-ePSS (1 symbol), NR-SSS (1 partial symbol to be multiplexed with NR-ePBCH), and NR-ePBCH (4 full symbols and 1 partial symbol to be multiplexed with NR-SSS), and is TDMed (NR-SSS can be FDMed with NR-ePBCH within a symbol) and mapped to consecutive symbols (e.g. NR-ePSS mapped to #0, NR-PSS mapped to #1, NR-ePBCH mapped to #2, #3, #5, and #6, and NR-SSS/NR-ePBCH mapped to #4 symbol within the enhanced NR-SS/PBCH block as in the figure).

In one embodiment, the mapping order can be NR-ePSS mapped to #0, NR-PSS mapped to #1, NR-ePBCH mapped to #2, #4, #5, and #6, and NR-SSS/NR-ePBCH mapped to #3 symbol within the enhanced NR-SS/PBCH block.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Figure 19:
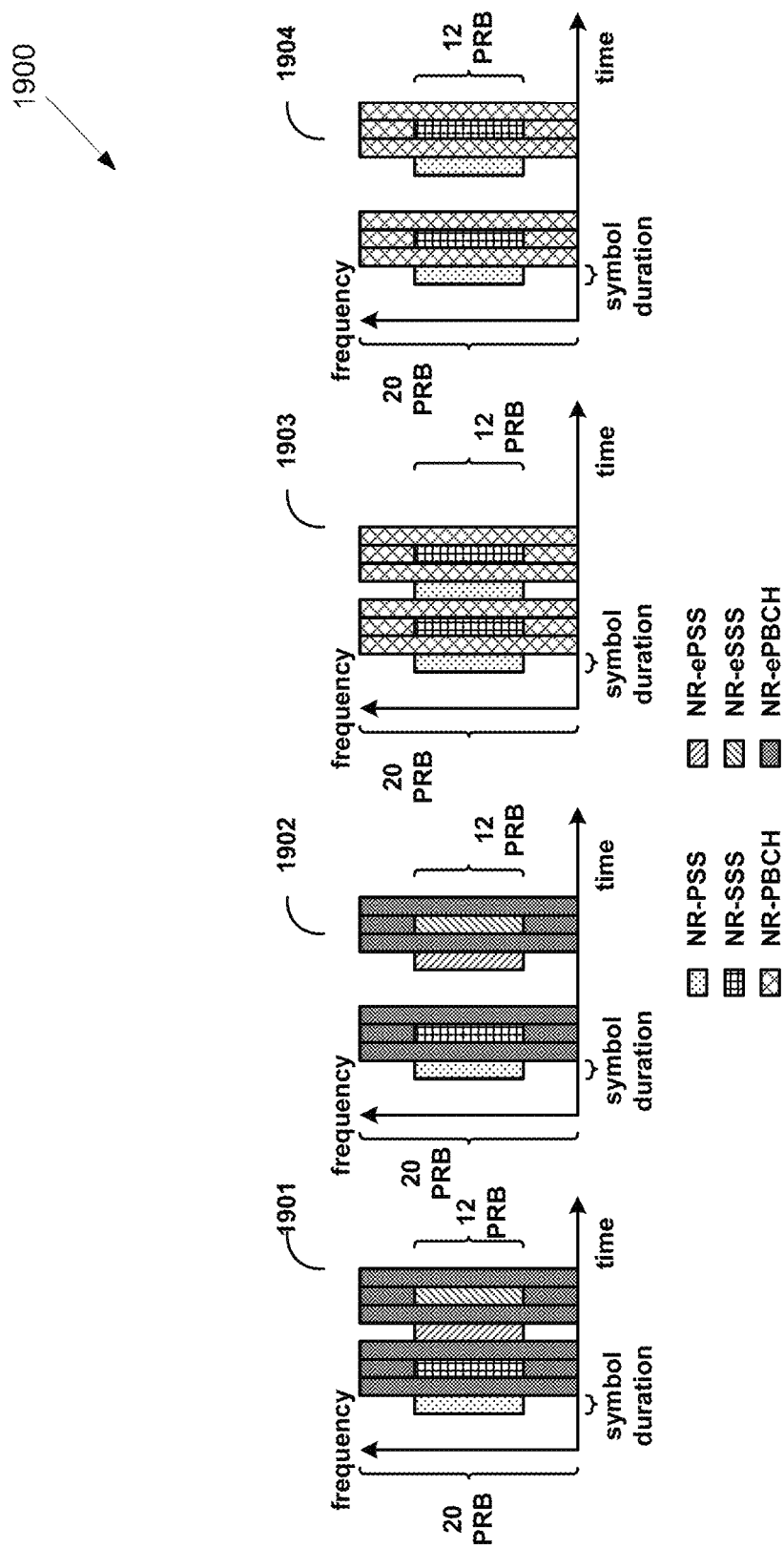
FIG. 19 illustrates yet another example NR-SS/PBCH block composition/mapping/multiplexing according to embodiments of the present disclosure.

FIG. 19 illustrates yet another example NR-SS/PBCH block composition/mapping/multiplexing 1900 according to embodiments of the present disclosure. The embodiment of the NR-SS/PBCH block composition/mapping/multiplexing 1900 illustrated in FIG. 10 is for illustration only. FIG. 19 does not limit the scope of this disclosure to any particular implementation.

In one example 1901 in FIG. 19, enhanced NR-SS/PBCH block contains NR-PSS (1 symbol), NR-SSS (1 partial symbol to be multiplexed with NR-ePBCH), NR-ePSS (1 symbol), NR-eSSS (1 partial symbol to be multiplexed with NR-ePBCH), and NR-ePBCH (4 full symbols and 2 partial symbols to be multiplexed with NR-SSS/NR-eSSS), and is TDMed (NR-SSS/NR-eSSS can be FDMed with NR-ePBCH within a symbol) and mapped to consecutive symbols (e.g. NR-PSS mapped to #0, NR-ePBCH mapped to #1, #3, #5, and #7, NR-SSS/NR-ePBCH mapped to #2, NR-eSSS/NR-ePBCH mapped to #6, and NR-ePSS mapped to #4 symbol within the enhanced NR-SS/PBCH block as in the figure).

In one embodiment, the enhanced NR-SS/PBCH block can be considered as combining of two neighboring LTE NR-SS/PBCH blocks (no gap between the two LTE NR-SS/PBCH blocks), with potential change on the PSS/SSS/PBCH, wherein the 2 LTE NR-SS/PBCH blocks are assumed to be transmitted using the port and assumed to be QCLed.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1902 in FIG. 19, enhanced NR-SS/PBCH block contains NR-PSS (1 symbol), NR-SSS (1 partial symbol to be multiplexed with NR-ePBCH), NR-ePSS (1 symbol), NR-eSSS (1 partial symbol to be multiplexed with NR-ePBCH), and NR-ePBCH (4 full symbols and 2 partial symbols to be multiplexed with NR-SSS/NR-eSSS), and is TDMed (NR-SSS/NR-eSSS can be FDMed with NR-ePBCH within a symbol) mapped to non-consecutive symbols, where the first group/sub-block (symbols before the gap) has k symbols (wherein k can be 1, 2, 3, 4, 5, 6 or 7), and the second group/sub-block (symbols after the gap) has 7-k symbols, and the gap can have K symbols (wherein K is an integer and K≥1). E.g. k=2 and K=4 in 1902.

In one embodiment, the enhanced NR-SS/PBCH block can be considered as combining of two neighboring LTE NR-SS/PBCH blocks (potential gap symbols between the two LTE NR-SS/PBCH blocks), with potential change on the PSS/SSS/PBCH, wherein the 2 LTE NR-SS/PBCH blocks are assumed to be transmitted using the port and assumed to be QCLed.

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

In one example of 1903 in FIG. 19, enhanced NR-SS/PBCH block contains NR-PSS (2 symbol), NR-SSS (2 partial symbol to be multiplexed with NR-PBCH), and NR-PBCH (4 full symbols and 2 partial symbols to be multiplexed with NR-SSS), and is TDMed (NR-SSS can be FDMed with NR-PBCH within a symbol) and mapped to consecutive symbols (e.g. NR-PSS mapped to #0 and #4, NR-PBCH mapped to #1, #3, #5, and #7, NR-SSS/NR-PBCH mapped to #2 and #6 symbol within the enhanced NR-SS/PBCH block as in the figure).

In one embodiment, the enhanced NR-SS/PBCH block can be considered as combining of two neighboring LTE NR-SS/PBCH blocks (no gap between the two LTE NR-SS/PBCH blocks), without change on the PSS/SSS/PBCH, wherein the 2 LTE NR-SS/PBCH blocks are assumed to be transmitted using the port and assumed to be QCLed.

In one example of 1904 in FIG. 19, enhanced NR-SS/PBCH block contains NR-PSS (2 symbol), NR-SSS (2 partial symbol to be multiplexed with NR-PBCH), and NR-PBCH (4 full symbols and 2 partial symbols to be multiplexed with NR-SSS), and is TDMed (NR-SSS can be FDMed with NR-PBCH within a symbol) and mapped to non-consecutive symbols, where the first group/sub-block (symbols before the gap) has k symbols (wherein k can be 1, 2, 3, 4, 5, 6 or 7), and the second group/sub-block (symbols after the gap) has 7-k symbols, and the gap can have K symbols (wherein K is an integer and K≥1). E.g. k=2 and K=4 in 1904.

In one embodiment, the enhanced NR-SS/PBCH block can be considered as combining of two neighboring LTE NR-SS/PBCH blocks (potential symbol gap between the two LTE NR-SS/PBCH blocks), without change on the PSS/SSS/PBCH, wherein the 2 LTE NR-SS/PBCH blocks are assumed to be transmitted using the port and assumed to be QCLed.

Figure 20:
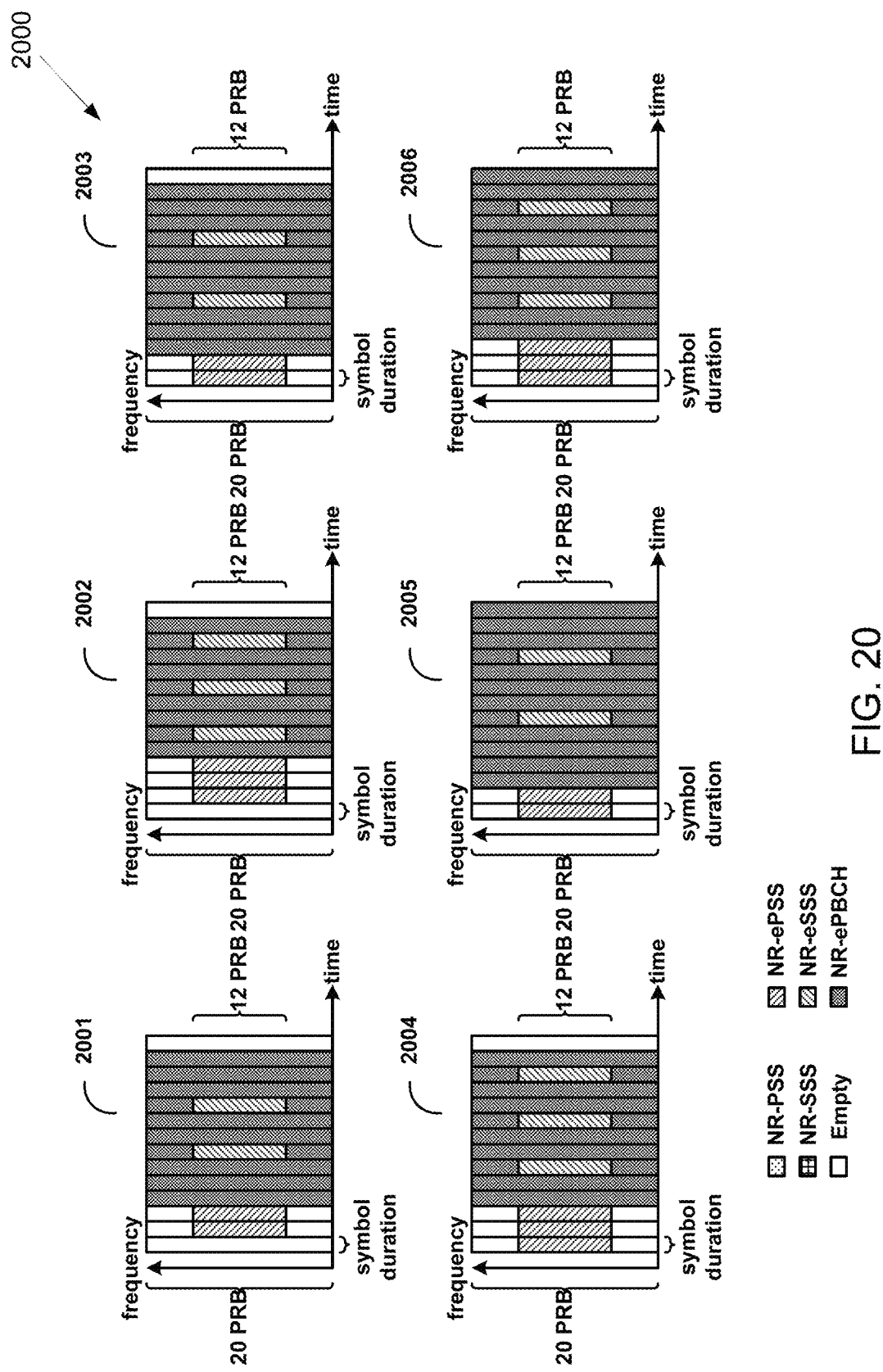
FIG. 20 illustrates yet another example NR-SS/PBCH block composition/mapping/multiplexing according to embodiments of the present disclosure.

FIG. 20 illustrates yet another example NR-SS/PBCH block composition/mapping/multiplexing 2000 according to embodiments of the present disclosure. The embodiment of the NR-SS/PBCH block composition/mapping/multiplexing 2000 illustrated in FIG. 20 is for illustration only. FIG. 20 does not limit the scope of this disclosure to any particular implementation.

In one example of 2001 in FIG. 20, enhanced NR-SS/PBCH block contains NR-ePSS (2 symbols), NR-eSSS (2 symbols), NR-ePBCH (8 symbols+2 partial symbols) and empty symbols (e.g. the first one and the last one), and is TDMed (NR-eSSS can be FDMed with NR-ePBCH within a symbol) and mapped to consecutive symbols (e.g. NR-ePSS mapped to #1 and #2, NR-ePBCH mapped to #3, #4, #5, #7, #8, #10, #11, and #12, NR-eSSS/NR-ePBCH mapped to #6 and #9 symbol within the enhanced NR-SS/PBCH block as in the figure, and #0 and #13 symbols are reserved as empty).

In one embodiment, the example can be utilized for V2X sidelink synchronization. Note that, the sequence for two symbols of NR-ePSS may not be the same (e.g. can choose different sequences or using a cover code over the same sequence). Also note that, the sequence for two symbols of NR-eSSS may not be the same (e.g. can choose different sequences or using a cover code over the same sequence). In one embodiment, the two NR-ePSS symbols are consecutive (e.g. to allow simpler detection), and two NR-eSSS/ePBCH symbols are not consecutive (e.g. to allow better channel estimation using NR-eSSS as DMRS for NR-ePBCH).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Another possible variant of this example is the symbol order. For example, NR-ePSS mapped to #1 and #2, NR-ePBCH mapped to #3, #4, #6, #7, #8, #9, #11, and #12, NR-eSSS/NR-ePBCH mapped to #5 and #10 symbol within the enhanced NR-SS/PBCH block, and #0 and #13 symbols are reserved as empty.

In one example of 2002 in FIG. 20, enhanced NR-SS/PBCH block contains NR-ePSS (3 symbols), NR-eSSS (3 symbols), NR-ePBCH (6 symbols+3 partial symbols) and empty symbols (e.g. the first one and the last one), and is TDMed (NR-eSSS can be FDMed with NR-ePBCH within a symbol) and mapped to consecutive symbols (e.g. NR-ePSS mapped to #1, #2 and #3, NR-ePBCH mapped to #4, #6, #7, #9, #10, and #12, NR-eSSS/NR-ePBCH mapped to #5, #8, and #11 symbol within the enhanced NR-SS/PBCH block as in the figure, and #0 and #13 symbols are reserved as empty).

In one embodiment, the example can be utilized for V2X sidelink synchronization. Note that, the sequence for 3 symbols of NR-ePSS may not be the same (e.g. can choose different sequences or using a cover code over the same sequence). Also note that, the sequence for 3 symbols of NR-eSSS may not be the same (e.g. can choose different sequences or using a cover code over the same sequence). In one embodiment, the 3 NR-ePSS symbols are consecutive (e.g. to allow simpler detection), and 3 NR-eSSS/ePBCH symbols are not consecutive (e.g. to allow better channel estimation using NR-eSSS as DMRS for NR-ePBCH).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Another possible variant of this example is the symbol order. For example, NR-ePSS mapped to #1, #2, and #3, NR-ePBCH mapped to #5, #6, #7, #9, #10, and #11, NR-eSSS/NR-ePBCH mapped to #4, #8, and #12 symbol within the enhanced NR-SS/PBCH block, and #0 and #13 symbols are reserved as empty.

In one example of 2003 in FIG. 20, enhanced NR-SS/PBCH block contains NR-ePSS (2 symbols), NR-eSSS (2 symbols), NR-ePBCH (9 symbols+2 partial symbols) and empty symbols (e.g. the first one or the last one), and is TDMed (NR-eSSS can be FDMed with NR-ePBCH within a symbol) and mapped to consecutive symbols (e.g. NR-ePSS mapped to #0 and #1, NR-ePBCH mapped to #2, #3, #4, #6, #7, #8, #10, #11, and #12, NR-eSSS/NR-ePBCH mapped to #5 and #9 symbol within the enhanced NR-SS/PBCH block as in the figure, and #13 symbol is reserved as empty).

In one embodiment, the example can be utilized for V2X sidelink synchronization. Note that, the sequence for two symbols of NR-ePSS may not be the same (e.g. can choose different sequences or using a cover code over the same sequence). Also note that, the sequence for two symbols of NR-eSSS may not be the same (e.g. can choose different sequences or using a cover code over the same sequence). In one embodiment, the two NR-ePSS symbols are consecutive (e.g. to allow simpler detection), and two NR-eSSS/ePBCH symbols are not consecutive (e.g. to allow better channel estimation using NR-eSSS as DMRS for NR-ePBCH).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Another possible variant of this example is the symbol order. For example, NR-ePSS mapped to #1 and #2, NR-ePBCH mapped to #3, #4, #5, #7, #8, #9, #11, #12, and #13, NR-eSSS/NR-ePBCH mapped to #6 and #10 symbol within the enhanced NR-SS/PBCH block, and #0 symbol is reserved as empty.

In one example of 2004 in FIG. 20, enhanced NR-SS/PBCH block contains NR-ePSS (3 symbols), NR-eSSS (3 symbols), NR-ePBCH (7 symbols+3 partial symbols) and empty symbols (e.g. the first one or the last one), and is TDMed (NR-eSSS can be FDMed with NR-ePBCH within a symbol) and mapped to consecutive symbols (e.g. NR-ePSS mapped to #0, #1, and #2, NR-ePBCH mapped to #3, #4, #6, #7, #9, #10, and #12, NR-eSSS/NR-ePBCH mapped to #5, #8, and #11 symbol within the enhanced NR-SS/PBCH block as in the figure, and #13 symbol is reserved as empty).

In one embodiment, the example can be utilized for V2X sidelink synchronization. Note that, the sequence for 3 symbols of NR-ePSS may not be the same (e.g. can choose different sequences or using a cover code over the same sequence). Also note that, the sequence for 3 symbols of NR-eSSS may not be the same (e.g. can choose different sequences or using a cover code over the same sequence). In one embodiment, the 3 NR-ePSS symbols are consecutive (e.g. to allow simpler detection), and 3 NR-eSSS/ePBCH symbols are not consecutive (e.g. to allow better channel estimation using NR-eSSS as DMRS for NR-ePBCH).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Another possible variant of this example is the symbol order. For example, NR-ePSS mapped to #0, #1, and #2, NR-ePBCH mapped to #3, #5, #6, #8, #9, #11, and #12, NR-eSSS/NR-ePBCH mapped to #4, #7, and #10 symbol within the enhanced NR-SS/PBCH block, and #13 symbol is reserved as empty. For another example, NR-ePSS mapped to #1, #2, and #3, NR-ePBCH mapped to #4, #6, #7, #9, #10, #12, and #13, NR-eSSS/NR-ePBCH mapped to #5, #8, and #11 symbol within the enhanced SS block, and #0 symbol is reserved as empty. NR-ePSS mapped to #1, #2, and #3, NR-ePBCH mapped to #4, #5, #7, #8, #10, #11, and #13, NR-eSSS/NR-ePBCH mapped to #6, #9, and #12 symbol within the enhanced NR-SS/PBCH block, and #0 symbol is reserved as empty.

In one example of 2005 in FIG. 20, enhanced NR-SS/PBCH block contains NR-ePSS (2 symbols), NR-eSSS (2 symbols), NR-ePBCH (10 symbols+2 partial symbols), and is TDMed (NR-eSSS can be FDMed with NR-ePBCH within a symbol) and mapped to consecutive symbols (e.g. NR-ePSS mapped to #0 and #1, NR-ePBCH mapped to #2, #3, #4, #5, #7, #8, #9, #11, #12, and #13, NR-eSSS/NR-ePBCH mapped to #6 and #10 symbol within the enhanced NR-SS/PBCH block as in the figure). In one embodiment, the example can be utilized for V2X sidelink synchronization. Note that, the sequence for two symbols of NR-ePSS may not be the same (e.g. can choose different sequences or using a cover code over the same sequence). Also note that, the sequence for two symbols of NR-eSSS may not be the same (e.g. can choose different sequences or using a cover code over the same sequence). In one embodiment, the two NR-ePSS symbols are consecutive (e.g. to allow simpler detection), and two NR-eSSS/ePBCH symbols are not consecutive (e.g. to allow better channel estimation using NR-eSSS as DMRS for NR-ePBCH).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Another possible variant of this example is the symbol order. For example, NR-ePSS mapped to #0 and #1, NR-ePBCH mapped to #2, #3, #4, #6, #7, #8, #9, #11, #12, and #13, NR-eSSS/NR-ePBCH mapped to #5 and #10 symbol within the enhanced NR-SS/PBCH block. For another example, NR-ePSS mapped to #0 and #1, NR-ePBCH mapped to #2, #3, #4, #6, #7, #8, #10, #11, #12, and #13, NR-eSSS/NR-ePBCH mapped to #5 and #9 symbol within the enhanced NR-SS/PBCH block.

In one example of 2006 in FIG. 20, enhanced NR-SS/PBCH block contains NR-ePSS (3 symbols), NR-eSSS (3 symbols), NR-ePBCH (8 symbols+3 partial symbols), and is TDMed (NR-eSSS can be FDMed with NR-ePBCH within a symbol) and mapped to consecutive symbols (e.g. NR-ePSS mapped to #0, #1, and #2, NR-ePBCH mapped to #3, #4, #6, #7, #9, #10, #12, and #13, NR-eSSS/NR-ePBCH mapped to #5, #8, and #11 symbol within the enhanced NR-SS/PBCH block as in the figure).

In one embodiment, the example can be utilized for V2X sidelink synchronization. Note that, the sequence for 3 symbols of NR-ePSS may not be the same (e.g. can choose different sequences or using a cover code over the same sequence). Also note that, the sequence for 3 symbols of NR-eSSS may not be the same (e.g. can choose different sequences or using a cover code over the same sequence). In one embodiment, the 3 NR-ePSS symbols are consecutive (e.g. to allow simpler detection), and 3 NR-eSSS/ePBCH symbols are not consecutive (e.g. to allow better channel estimation using NR-eSSS as DMRS for NR-ePBCH).

A possible variant of this example is NR-ePSS and/or NR-eSSS can have wider bandwidth than NR-PSS and NR-SSS (e.g. NR-ePSS and/or NR-eSSS occupy 20 PRBs or 24 PRBs).

Another possible variant of this example is the symbol order. Note that as discussed in the previous design consideration, the aforementioned embodiments, sub-embodiments, and examples can apply to different application scenarios. For instance, one example with certain variation (e.g. Example 1701 to 1705 or 1801 to 1805) can be used for unlicensed spectrum, while another example with certain variation (e.g. Example 2001 to 2006) can be used for V2X sidelink. For another instance, one example with certain variation (e.g. Example 1301 or 1302) can be used for non-standalone scenario, while another example with certain variation (e.g. Example 1801 to 1805) can be used for standalone scenario. For yet another instance, the gap location within the enhanced NR-SS/PBCH block can be different for different enhanced NR-SS/PBCH blocks, e.g. different examples can be utilized for different enhanced NR-SS/PBCH blocks.

For LTE NR, NR-PSS is constructed by frequency-domain BPSK modulated length-127 M-sequence, where cyclic shifts are performed to represent the cell ID information carried by NR-PSS. NR-PSS is mapped the central 12 PRBs of the transmission bandwidth, where the central RE is aligned with the one for NR-SSS and NR-PBCH.

For enhanced NR-SS/PBCH block, enhanced NR-PSS (i.e., NR-ePSS) is also responsible for time-domain and frequency-domain synchronization and cell search, and the following embodiments are considered for NR-ePSS construction. Note that the sequence design in this component can be combined with any one of the enhanced NR-SS/PBCH block design in the aforementioned embodiments (e.g. for those examples containing NR-ePSS), and same or different embodiments and/or sub-embodiments can be utilized for different application scenarios (e.g. carrier frequency ranges and/or standalone/non-standalone scenarios), and same or different embodiments and/or sub-embodiments can be utilized for each of the NR-ePSS if multiple symbols for NR-ePSS are supported (e.g. as in Example 2001 to 2006).

In one embodiment 1, the sequence to construct NR-ePSS is the same as NR-PSS, i.e., NR-ePSS is also constructed by frequency-domain BPSK modulated length-127 M-sequence (e.g. generator $g(x)=x^7+x^4+1$) with the initial condition $x(6:0)=1110110$. Three cyclic shifts [0, 43, 86] are performed on the basic sequence to represent the cell ID information $N_{ID}^{(2)}$ (the cyclic shifts of NR-ePSS and NR-PSS mapped for the cell ID information $N_{ID}^{(2)}$ are the same).

In one example, NR-ePSS is mapped to the same subcarriers in the same order as NR-PSS in frequency domain (i.e., NR-ePSS occupies central 12 PRBs and central RE of NR-ePSS is aligned with NR-PSS).

In another example, NR-ePSS is mapped to the same subcarriers as NR-PSS in frequency domain (i.e., NR-ePSS occupies central 12 PRBs and central RE of NR-ePSS is aligned with NR-PSS), but in the reverse order. For example, the first element of NR-PSS sequence and the last element of NR-ePSS sequence are mapped to the same subcarrier.

In one embodiment 2, the sequence to construct NR-ePSS is given by frequency-domain BPSK modulated length-127 M-sequence scrambled by another length-127 sequence, i.e., $d_{ePSS}(n)=(1-2d_M(n))*d_S(n)$, where $0 \leq n \leq 126$, $d_M(n)$ is a length-127 M-sequence (e.g. same as NR-PSS, i.e., generator $g(x)=x^7+x^4+1$ with the initial condition $x(6:0)=1110110$), and $d_S(n)$ is a length-127 scrambling sequence (or cover code). Three cyclic shifts [0, 43, 86] are performed on $d_M(n)$ to represent the cell ID information $N_{ID}^{(2)}$ (the cyclic shifts of NR-ePSS and NR-PSS mapped for the cell ID information $N_{ID}^{(2)}$ are the same). NR-ePSS is mapped to the same subcarriers as NR-PSS in frequency domain (i.e., NR-ePSS occupies central 12 PRBs and central RE of NR-ePSS is aligned with NR-PSS).

In one example, $d_S(n)$ is a constant sequence (e.g. effectively same as a phase shift sequence). For example, $d_S(n)=-1$ for all n. For another example, $d_S(n)=\exp(j2\pi\theta)$, where $\theta$ is a constant phase.

In another example, $d_S(n)$ is another BPSK modulated length-127 M-sequence (e.g. generator $f(x)=x^7+x^3+1$ or $f(x)=x^7+x+1$ with proper initial condition like $x(6:0)=0000001$). In this sub-embodiment, $d_S(n)$ can be either common for three cell IDs (i.e., $d_S(n)$ does not contains cell ID information), or $d_S(n)$ can be using the same cyclic shifts (i.e., [0, 43, 86]) to represent the cell ID information $N_{ID}^{(2)}$.

In one embodiment 3, the sequence to construct NR-ePSS is given by frequency-domain BPSK modulated length-127 M-sequence (e.g. same basic sequence as NR-PSS) with cyclic shifts different from NR-PSS to represent the cell ID information $N_{ID}^{(2)}$, i.e., $d_{ePSS}(n)=(1-2d_M(n))$, where $0 \leq n \leq 126$, and $d_M(n)$ is a length-127 M-sequence (e.g. generator $g(x)=x^7+x^4+1$ with the initial condition $x(6:0)=1110110$) with cyclic shift chosen from [c1, c2, c3] to represent cell ID information $N_{ID}^{(2)}=[0, 1, 2]$, correspondingly. NR-ePSS can be mapped to the same subcarriers as NR-PSS in frequency domain (i.e., NR-ePSS occupies central 12 PRBs and central RE of NR-ePSS is aligned with NR-PSS).

In one example, c1=21, c2=64, c3=107. In another example, c1=22, c2=65, c3=108. In yet another example, c1=64, c2=107, c3=21. In yet another example, c1=65, c2=108, c3=22.

In one embodiment 4, the sequence to construct NR-ePSS is given by frequency-domain BPSK modulated length-127 M-sequence (e.g. different basic sequence from NR-PSS) with cyclic shifts to represent the cell ID information $N_{ID}^{(2)}$, i.e., $d_{ePSS}(n)=(1-2d_M(n))$, where $0 \leq n \leq 126$, and $d_M(n)$ is a length-127 M-sequence with generator $g(x)$ and cyclic shift chosen from [c1, c2, c3] to represent cell ID information $N_{ID}^{(2)}=[0, 1, 2]$ correspondingly. NR-ePSS is mapped to the same subcarriers as NR-PSS in frequency domain (i.e., NR-ePSS occupies central 12 PRBs and central RE of NR-ePSS is aligned with NR-PSS).

The selection of generator for $d_M(n)$ can be $g(x)=x^7+x+1$, or $g(x)=x^7+x^3+1$. The selection of initial condition for $d_M(n)$ can be $x(6:0)=1110110$, or $x(6:0)=0000001$, or $x(6:0)=1000000$. The selection of cyclic shift set [c1, c2, c3] for $d_M(n)$ can be [0, 43, 86], or [21, 64, 107], or [22, 65, 108].

Note that the above examples of selection for generator, initial condition, and cyclic shift set can be combined. For instance, $d_M(n)$ can be constructed from generator $g(x)=x^7+x+1$ with initial condition $x(6:0)=1110110$ and cyclic shift from [0, 43, 86] to represent cell ID information $N_{ID}^{(2)}=[0, 1, 2]$ correspondingly.

In one embodiment 5, the sequence to construct NR-ePSS is given by frequency-domain BPSK modulated length-255 M-sequence with cyclic shifts to represent the cell ID information $N_{ID}^{(2)}$, i.e., $d_{ePSS}(n)=(1-2d_M(n))$, where $0 \leq n \leq 254$, and $d_M(n)$ is a length-255 M-sequence with generator $g(x)$ and cyclic shift chosen from [c1, c2, c3] to represent cell ID information $N_{ID}^{(2)}=[0, 1, 2]$ correspondingly. NR-ePSS occupies central 12 PRBs and central RE of NR-ePSS is aligned with NR-PSS.

The selection of generator for $d_M(n)$ can be $g(x)=x^8+x^7+x^6+x+1$, or $g(x)=x^8+x^7+x^2+x+1$. The selection of initial condition for $d_M(n)$ can be $x(7:0)=11110110$, or $x(7:0)=00000001$, or $x(7:0)=10000000$. The selection of cyclic shift set [c1, c2, c3] for $d_M(n)$ can be [0, 85, 170].

Note that the above examples of selection for generator, initial condition, and cyclic shift set can be combined. For example, $d_M(n)$ can be constructed from generator $g(x)=x^8+x^7+x^6+x+1$ with initial condition $x(7:0)=0000001$ and cyclic shift from [0, 85, 170] to represent cell ID information $N_{ID}^{(2)}=[0, 1, 2]$ correspondingly.

In one embodiment 6, the sequence to construct NR-ePSS is given by frequency-domain length-127 ZC-sequence with different root index to represent the cell ID information $N_{ID}^{(2)}$, i.e., $d_{ePSS}(n)=d_{ZC}^{(u)}(n)$, where $0 \leq n \leq 126$, and $d_{ZC}^{(u)}(n)$ is a length-127 ZC-sequence with root index chosen from [u1, u2, u3] to represent cell ID information $N_{ID}^{(2)}=[0, 1, 2]$ correspondingly. NR-ePSS is mapped to the same subcarriers as NR-PSS in frequency domain (i.e., NR-ePSS occupies central 12 PRBs and central RE of NR-ePSS is aligned with NR-PSS).

In one embodiment 7, the sequence to construct NR-ePSS does not contain any ID information (i.e., only single NR-ePSS sequence), wherein the ID information can refer to either cell ID or sidelink synchronization ID depending the ID information's application scenario.

In one example, NR-ePSS is constructed from frequency-domain length-127 M-sequence without cyclic shift (or equivalent as cyclic shift to be 0). For example, $d_{ePSS}(n)=1-2d_M(n)$, where $0 \leq n \leq 126$, generator for $d_M(n)$ can be $g(x)=x^7+x+1$ (or $g(x)=x^7+x^4+1$, or $g(x)=x^7+x^3+1$ or $g(x)=x^7+x^6+1$) with initial condition $x(6:0)=1110110$, or $x(6:0)=0000001$, or $x(6:0)=1000000$. NR-ePSS is mapped to the same subcarriers as NR-PSS in frequency domain (i.e., NR-ePSS occupies central 12 PRBs and central RE of NR-ePSS is aligned with NR-PSS).

In one example, when multiple NR-ePSS symbols are supported (e.g. in V2X sidelink), the sequence for multiple NR-ePSS symbols can be the same and utilizes one of the above examples in the embodiments.

In another example, when multiple NR-ePSS symbols are supported (e.g. in V2X sidelink), the sequences for multiple NR-ePSS symbols can be different and each one uses one of the above examples in the embodiments. E.g. when two NR-ePSS symbols are supported, the sequence for one of the NR-ePSS uses Embodiment 7 with generator $g(x)=x^7+x+1$, and the sequence for the other NR-ePSS uses Embodiment 7 with generator $g(x)=x^7+x^4+1$. E.g. when two NR-ePSS symbols are supported, the sequence for one of the NR-ePSS uses Embodiment 7 with generator $g(x)=x^7+x^3+1$, and the sequence for the other NR-ePSS uses Embodiment 7 with generator $g(x)=x^7+x^6+1$.

For LTE NR-SS/PBCH block, NR-SSS is constructed by frequency-domain BPSK modulated length-127 Gold-sequence (XOR of two M-sequences), where cyclic shifts are performed on each of the M-sequences to represent the cell ID information carried by NR-PSS and NR-SSS (i.e., $N_{ID}^{(2)}$ and $N_{ID}^{(1)}$). NR-SSS is mapped the central 12 PRBs of the transmission bandwidth, where the central RE is aligned with the one for NR-PSS and NR-PBCH.

For enhanced NR-SS/PBCH block, enhanced NR-SSS (NR-eSSS) can also be responsible for delivering the ID information (wherein the ID can refer to either cell ID or sidelink synchronization ID depending on the application scenario), and the following embodiments are considered for NR-eSSS construction. Note that the sequence design in this component can be combined with any one of the enhanced NR-SS/PBCH block design in the aforementioned embodiments (e.g. for those examples containing NR-eSSS), and same or different embodiments and/or sub-embodiments can be utilized for different application scenarios (e.g. carrier frequency ranges and/or standalone/non-standalone scenarios), and same or different embodiments and/or sub-embodiments can be utilized for each of the NR-eSSS if multiple symbols for NR-eSSS are supported (e.g. as in Example 2001 to 2006).

In one embodiment 8, the sequence to construct NR-eSSS is the same as NR-SSS, i.e., NR-eSSS is also constructed by frequency-domain BPSK modulated length-127 Gold-sequence (e.g. generator $g_0(x)=x^7+x^4+1$ and $g_1(x)=x^7+x+1$) with the initial condition x(6:0)=0000001 for both M-sequences. Cyclic shifts $m_0$ and $m_1$ are generated the same way as NR-SSS, i.e., $m_0=15[N_{ID}^{(1)}/112]+5\ N_{ID}^{(2)}$, and $m_1=(N_{ID}^{(1)} \bmod 112)$, and are performed on the M-sequence to carry the ID information.

In one embodiment 9, the sequence to construct NR-eSSS is given by NR-SSS scrambled by another length-127 sequence, i.e., $d_{eSSS}(n)=d_{SSS}(n)*d_S(n)$, where $0 \le n \le 126$, $d_{SSS}(n)$ is the same as NR-SSS sequence (as in Embodiment 8 of this component), and $d_S(n)$ is a length-127 scrambling sequence (or cover code). NR-eSSS can be mapped to the same subcarriers as NR-SSS in frequency domain (i.e., NR-eSSS occupies central 12 PRBs and central RE of NR-eSSS is aligned with NR-SSS), or NR-eSSS can be mapped to interleaved subcarriers in frequency domain (i.e., odd subcarrier # or even subcarrier # within the central 24 PRBs).

In one example, $d_S(n)$ is a constant sequence (e.g. equivalent as a phase shift sequence). For example, $d_S(n)=-1$ for all n. For another example, $d_S(n)=\exp(j2\pi\theta)$, where $\theta$ is a constant phase. Note that when multiple NR-eSSS symbols are supported, the phase shift can be different for each symbol.

In one embodiment 10, the sequence to construct NR-eSSS is similar to NR-SSS, i.e., NR-eSSS is also constructed by frequency-domain BPSK modulated length-127 Gold-sequence (XOR of two M-sequences), but generators of the M-sequences $g_2(x)$ and $g_3(x)$ are different from NR-SSS. For example, cyclic shifts $m_0$ and $m_1$ can be generated the same way as NR-SSS, i.e., $m_0=15[N_{ID}^{(1)}/112]+5\ N_{ID}^{(2)}$, and $m_1=(N_{ID}^{(1)} \bmod 112)$. NR-eSSS can be mapped to the same subcarriers as NR-SSS in frequency domain (i.e., NR-eSSS occupies central 12 PRBs and central RE of NR-eSSS is aligned with NR-SSS), or NR-eSSS can be mapped to interleaved subcarriers in frequency domain (i.e., odd subcarrier # or even subcarrier # within central 24 PRBs). For example, generators for NR-eSSS can be $g_2(x)=x^7+x^3+1$ and $g_3(x)=x^7+x^6+1$.

In one embodiment 11, the sequence to construct NR-eSSS is given by frequency-domain BPSK modulated length-255 Gold-sequence (e.g. two generators are $g_2(x)=x^8+x^7+x^6+x+1$ and $g_3(x)=x^8+x^7+x^2+x+1$). For example, initial condition can be x(7:0)=00000001 for both M-sequences. Cyclic shifts $m_0$ and $m_1$ can be generated from $m_0=15[N_{ID}^{(1)}/112]+5\ N_{ID}^{(2)}$, and $m_1=(N_{ID}^{(1)} \bmod 112)$; or $m_0=30[N_{ID}^{(1)}/112]+10\ N_{ID}^{(2)}$, and $m_1=(N_{ID}^{(1)} \bmod 112)$. NR-eSSS occupies central 12 PRBs and central RE of NR-eSSS is aligned with NR-SSS.

In one embodiment 12, the sequence to construct NR-eSSS is a frequency-domain repetition of two NR-SSS sequences. In one example, there can be cover codes applied to the two repetitions, e.g. one of them applied by all +1 sequence, and the other applied all −1 sequence. In one example, the mapping order of the two repetitions can be reversed from each other, e.g. one of them with lowest-to-highest RE mapping order, and the other with highest-to-lowest RE mapping order.

Regarding the mapping of ePSS, the following examples can be combined with the sequence design in the aforementioned embodiments. In one example, NR-eSSS is mapped to the same subcarriers in the same order as NR-SSS in frequency domain (i.e., NR-eSSS occupies central 12 PRBs and central RE of NR-eSSS is aligned with NR-SSS).

In another example, NR-eSSS is mapped to the same subcarriers as NR-SSS in frequency domain (i.e., NR-eSSS occupies central 12 PRBs and central RE of NR-eSSS is aligned with NR-SSS), but in the reverse order. For example, the first element of NR-SSS sequence and the last element of NR-eSSS sequence are mapped to the same subcarrier.

In yet another example, NR-eSSS is mapped to interleaved subcarriers (odd subcarrier # or even subcarrier #) in frequency domain (e.g. total bandwidth of NR-eSSS is 24 PRBs).

In yet another example, when multiple NR-eSSS symbols are supported, the sequence generation method can be the same as NR-SSS, and mapped in the same order to REs in one or more of the NR-eSSS symbols, and mapped in the reversed order to REs in the other NR-eSSS symbol(s).

In yet another example, when multiple NR-eSSS symbols are supported, the sequence generation method can be different (each is independently chosen from examples in the embodiments above), and mapped in a same way in different symbols.

For LTE NR-SS/PBCH block, #1 and #3 symbols within the LTE NR-SS/PBCH block are mapped for NR-PBCH and DMRS, where each symbol has 288 REs (24 PRBs) and the center is aligned with NR-PSS and NR-SSS. DMRS occupies 3 uniformly distributed REs within each PRB and symbol such that the total number of REs within an LTE NR-SS/PBCH block for DMRS is 144, while the total number of REs within an LTE NR-SS/PBCH block for NR-PBCH is 432. NR-PBCH coded bits are mapped across REs in the two symbols.

For enhanced NR-SS/PBCH block, the following embodiments are considered for NR-ePBCH. Note that the NR-ePBCH design in this component can be combined with any one of the enhanced NR-SS/PBCH block design in the aforementioned embodiments (e.g. for those examples containing NR-ePBCH), and same or different embodiments and/or sub-embodiments can be utilized for different application scenarios (e.g. carrier frequency ranges and/or standalone/non-standalone scenarios).

In one embodiment 13, NR-ePBCH is a repetition of NR-PBCH or a repetition of part of NR-PBCH. In one example, if NR-ePBCH only occupies one symbol within each enhanced NR-SS/PBCH block, NR-ePBCH can be a repetition of one of the NR-PBCH symbols. In another example, if NR-ePBCH occupies two symbols within each enhanced NR-SS/PBCH block, NR-ePBCH can be a repetition of both of the NR-PBCH symbols, and the multiplexing order can be either the same as NR-PBCH or the reverse from NR-PBCH. In yet another example, if NR-ePBCH occupies more than two symbols within each enhanced NR-SS/PBCH block, NR-ePBCH can be multiple repetitions of NR-PBCH symbols, or part of NR-ePBCH can be multiple repetitions of NR-PBCH symbols.

In one embodiment 14, NR-ePBCH is NR-PBCH with scrambling sequence or a part of NR-PBCH with scrambling sequence. In one example, if NR-ePBCH only occupies one symbol within each enhanced NR-SS/PBCH block, NR-ePBCH can be one of the NR-PBCH symbols with scrambling sequence. In another example, if NR-ePBCH occupies two symbols within each enhanced NR-SS/PBCH block, NR-ePBCH can be both of the NR-PBCH symbols with scrambling sequence, and the multiplexing order can be either the same as NR-PBCH or the reverse from NR-PBCH. In yet another example, if NR-ePBCH occupies more than two symbols within each enhanced NR-SS/PBCH block, NR-ePBCH can be multiple repetitions of NR-PBCH symbols then with scrambling sequence, or part of NR-ePBCH can be multiple repetitions of NR-PBCH symbols then with scrambling sequence.

In one embodiment 15, MIB in NR-ePBCH is encoded and rate matched separately from NR-PBCH, e.g. to different number of REs. In one example, if NR-ePBCH occupies N symbols within each enhanced NR-SS/PBCH block, MIB in NR-ePBCH can be encoded and rate matched to N symbols, where the encoding procedure is similar to NR-PBCH (e.g. using the same generation matrix of polar codes). For example, N=3. For another example, N=4.

In one embodiment 16, if NR-ePBCH occupies multiple symbols (e.g. N>1), the mixture/combination of above embodiments can be utilized. For example, some of the NR-ePBCH symbols are repetitions of NR-PBCH, while the remaining ones are NR-PBCH with scrambling sequence. For another example, some of the NR-ePBCH symbols are repetitions of NR-PBCH, while the remaining ones are encoded and rate matched separately.

For LTE NR-SS/PBCH block, #1 and #3 symbols within the LTE NR-SS/PBCH block are mapped for NR-PBCH and DMRS, where each symbol has 288 REs (24 PRBs) and the center is aligned with NR-PSS and NR-SSS. DMRS occupies 3 uniformly distributed REs within each PRB and symbol such that the total number of REs within an LTE NR-SS/PBCH block for DMRS is 144, while the total number of REs within an LTE NR-SS/PBCH block for NR-PBCH is 432. DMRS for NR-PBCH also carries 8 or 4 timing hypotheses (e.g. part of or the whole of the LTE NR-SS/PBCH block index within a NR-SS/PBCH burst set).

For enhanced NR-SS/PBCH block, the functionality of DMRS for NR-ePBCH remain the same, e.g. for demodulation and possibly carrying timing hypotheses. The following design aspects are considered for DMRS for NR-ePBCH. Note that the design embodiments and/or sub-embodiments for design aspects can be combined.

In one aspect 1, whether DMRS for NR-ePBCH carries timing information and how many timing hypotheses are carried by DMRS.

In one embodiment, DMRS for NR-ePBCH does not carry any timing information, and only serves as the demodulation reference signal. For example, if number of REs for DMRS for NR-ePBCH is smaller than LTE NR-SS/PBCH block, or the number of timing hypotheses is smaller than LTE NR-SS/PBCH block (or no timing hypotheses at all for certain carrier frequency range, e.g. some unlicensed spectrum or sidelink bands), DMRS for NR-ePBCH may not carry any timing hypotheses.

In another embodiment, DMRS for NR-ePBCH carries timing information, and carries smaller number of timing hypotheses compared from LTE NR-SS/PBCH block. For example, if number of REs for DMRS for NR-ePBCH is smaller than LTE NR-SS/PBCH block, or the number of timing hypotheses is smaller than LTE NR-SS/PBCH block, DMRS for NR-ePBCH may carry smaller number of hypotheses.

In yet another embodiment, DMRS for NR-ePBCH carries timing information, and carries same number of timing hypotheses as LTE NR-SS/PBCH block. This embodiment can be applicable to the cases whether or not the number of REs for DMRS for NR-ePBCH is the same as LTE NR-SS/PBCH block.

In yet another embodiment, DMRS for NR-ePBCH carries timing information, and carries larger number of timing hypotheses compared from LTE NR-SS/PBCH block. For example, if number of REs for DMRS for NR-ePBCH is larger than LTE NR-SS/PBCH block, or the number of timing hypotheses is larger than LTE NR-SS/PBCH block, DMRS for NR-ePBCH may carry larger number of hypotheses.

In another aspect 2, DMRS RE overhead and mapping pattern. In one embodiment, DMRS for NR-ePBCH are mapped to the same REs within a symbol as DMRS for NR-PBCH (by default, DMRS for NR-ePBCH has the same number of REs within a symbol as the one for NR-PBCH).

In another embodiment, DMRS for NR-ePBCH has the same number of REs within a symbol as the one for NR-PBCH (e.g. same overhead), but mapped to different REs within a symbol compared from DMRS for NR-PBCH. For example, there is an offset (can either be positive or negative) between RE locations of DMRS for NR-ePBCH and the one for NR-PBCH.

In yet another embodiment, DMRS for NR-ePBCH has different number of REs within a symbol compared to the one for NR-PBCH (e.g. different overhead). For example, DMRS for NR-ePBCH has larger number of REs within a symbol compared to the one for NR-PBCH (e.g. larger overhead). For another example, DMRS for NR-ePBCH has smaller number of REs within a symbol compared to the one for NR-PBCH (e.g. smaller overhead).

In yet another embodiment, DMRS for NR-ePBCH are mapped to a subset of symbols for NR-ePBCH (occupying the entire REs within the enhanced NR-SS/PBCH block BW), and TDMed with other symbols for NR-ePBCH.

In yet another embodiment, DMRS for NR-ePBCH are mapped to all the remaining REs for NR-ePBCH within the symbols wherein NR-ePBCH is multiplexed with NR-eSSS, and TDMed with other symbols for NR-ePBCH.

In yet another embodiment, DMRS for NR-ePBCH are mapped to a subset of symbols for NR-ePBCH (occupying the entire REs within the enhanced NR-SS/PBCH block BW) as well as all the remaining REs for NR-ePBCH within the symbols wherein NR-ePBCH is multiplexed with NR-eSSS, and TDMed with other symbols for NR-ePBCH.

In one aspect 3, DMRS sequence is considered. In one embodiment, DMRS for NR-ePBCH uses the same sequence as DMRS for NR-PBCH. If the number of REs for DMRS of NR-ePBCH and NR-PBCH is different, concatenation and/or truncation can be performed to fit the number of REs for the DMRS of NR-ePBCH.

In another embodiment, DMRS for NR-ePBCH and DMRS for NR-PBCH are generated from the same basic sequence, but truncated to different length to fit the number of REs correspondingly. For example, DMRS for NR-ePBCH and DMRS for NR-PBCH are both generated from the same Gold-sequence, but truncated to different lengths for DMRS of NR-ePBCH and DMRS of NR-PBCH correspondingly.

In one aspect 4, what timing information is carried by DMRS. The timing information carried by DMRS can be determined by the carrier frequency range and/or application scenario. At least one of or combination of multiple of the following embodiments can be supported.

In one embodiment, the timing information includes the enhanced NR-SS/PBCH block index or partial of the enhanced NR-SS/PBCH block index (e.g. LSBs of the enhanced NR-SS/PBCH block index).

In another embodiment, the timing information includes the half radio frame indicator. In yet another embodiment, the timing information includes part of the SFN. For example, LSB(s) of SFN. For another example, the SFN bits not scrambled in the first level scrambling sequence of NR-PBCH.

In yet another embodiment, the timing information includes the timing offset between the start of the transmission of the enhanced NR-SS/PBCH block and a reference timing, wherein the reference timing can be at least one of the following examples.

In one example 1, the start of the frame wherein the enhanced NR-SS/PBCH block is transmitted. In one example 2, the start of the half frame wherein the enhanced NR-SS/PBCH block is transmitted. In one example 3, the start of a window wherein the enhanced NR-SS/PBCH block is transmitted, and the start of a window location is one from a predefined set.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for receiving signals in a wireless communication system, the UE comprising:
a transceiver configured to receive, from a base station (BS), an enhanced synchronization signal and physical broadcast channel (eSS/PBCH) block comprising multiple consecutive symbols over downlink channels, wherein each of the multiple consecutive symbols of the eSS/PBCH block is received from a same antenna port of the BS; and
a processor operably connected to the transceiver, the processor configured to:
determine resources in the downlink channels to receive the eSS/PBCH block from the BS; and
determine the eSS/PBCH block comprising the multiple consecutive symbols based on the determined resources, wherein each of the multiple consecutive symbols includes at least one of an enhanced primary synchronization signal (ePSS), an enhanced secondary synchronization signal (eSSS), or an enhanced PBCH (ePBCH).

2. The UE of claim 1, wherein the processor is further configured to determine symbols consecutively mapped for the ePSS and a primary synchronization signal (PSS) when the eSS/PBCH block includes symbols mapped for the ePSS and the PSS, the symbols being included in the multiple consecutive symbols of the eSS/PBCH block.

3. The UE of claim 1, wherein, when the eSS/PBCH block includes symbols mapped for the eSSS and a secondary synchronization signal (SSS), the processor is further configured to:

determine the symbols that are non-consecutively mapped for the eSSS and the SSS, the symbols of the multiple consecutive symbols being included in the eSS/PBCH block; and
determine at least one symbol that is mapped for the ePBCH, the at least one symbol being located between a symbol mapped for the eSSS and a symbol mapped for the SSS.

4. The UE of claim 1, wherein the processor is further configured to:
determine a sequence to be used for constructing the ePSS; and
determine a polynomial for an M-sequence generating the determined sequence.

5. The UE of claim 4, wherein the polynomial for the M-sequence is given by $g(x)=x^7+x+1$.

6. The UE of claim 1, wherein the processor is further configured to determine a sequence constructing the eSSS based on a sequence constructing a secondary synchronization signal (SSS) with a predefined scrambling sequence.

7. The UE of claim 1, wherein the processor is further configured to:
determine other resources to receive a demodulation reference signal (DMRS) of the ePBCH, the other resources to receive the DMRS of the ePBCH being a subset of the resources to receive the eSS/PBCH block; and
determine a sequence to be used for constructing the DMRS of the ePBCH, the sequence carrying timing information that includes at least one of part of a system frame number (SFN) or timing offset between a start of the eSS/PBCH block and a start of a half frame where the eSS/PBCH block is located.

8. A base station (BS) for transmitting signals in a wireless communication system, the BS comprising:
a processor configured to:
determine resources in downlink channels to transmit an enhanced synchronization signal and physical broadcast channel (eSS/PBCH) block to a user equipment (UE); and
generate the eSS/PBCH block comprising multiple consecutive symbols based on the determined resources, wherein each of the multiple consecutive symbols includes at least one of an enhanced primary synchronization signal (ePSS), an enhanced secondary synchronization signal (eSSS), or an enhanced PBCH (ePBCH); and
a transceiver operably connected to the processor, the transceiver configured to transmit, to the UE, the eSS/PBCH block over the downlink channels, wherein each of multiple consecutive symbols of the eSS/PBCH block is transmitted using a same antenna port for the transceiver.

9. The BS of claim 8, wherein the processor is further configured to consecutively map symbols of the multiple consecutive symbols included in the eSS/PBCH block for the ePSS and a primary synchronization signal (PSS) when the eSS/PBCH block includes the symbols to be mapped for the ePSS and the PSS.

10. The BS of claim 8, wherein, when the eSS/PBCH block contains symbols mapped for the eSSS and a secondary synchronization signal (SSS), the processor is further configured to:
non-consecutively map the symbols of the multiple consecutive symbols included in the eSS/PBCH block for the eSSS and the SSS; and map at least one symbol for the ePBCH, the at least one symbol being located between a symbol mapped for the eSSS and a symbol mapped for the SSS.

11. The BS of claim 8, wherein the processor is further configured to:
   determine a sequence to be used for constructing the ePSS; and
   determine a polynomial for an M-sequence generating the determined sequence.

12. The BS of claim 11, wherein the polynomial for the M-sequence is given by $g(x)=x^7+x+1$.

13. The BS of claim 8, wherein the processor is further configured to determine a sequence constructing the eSSS based on a sequence constructing a secondary synchronization signal (SSS) with a predefined scrambling sequence.

14. The BS of claim 8, wherein the processor is further configured to:
   determine other resources to receive a demodulation reference signal (DMRS) of the ePBCH, the other resources to receive the DMRS of the ePBCH being a subset of the resources to receive the eSS/PBCH block; and
   determine a sequence to be used for constructing the DMRS of the ePBCH, the sequence carrying timing information that includes at least one of part of a system frame number (SFN) or timing offset between a start of the eSS/PBCH block and a start of a half frame where the eSS/PBCH block is located.

15. A method of a user equipment (UE) for receiving signals in a wireless communication system, the method comprising:
   receiving an enhanced synchronization signal and physical broadcast channel (eSS/PBCH) block comprising multiple consecutive symbols over downlink channels, wherein each of the multiple consecutive symbols of the eSS/PBCH block is received from a same antenna port of the BS;
   determining resources in the downlink channels to receive the eSS/PBCH block from the BS; and
   determining the eSS/PBCH block comprising the multiple consecutive symbols based on the determined resources, wherein each of the multiple consecutive symbols includes at least one of an enhanced primary synchronization signal (ePSS), an enhanced secondary synchronization signal (eSSS), or an enhanced PBCH (ePBCH).

16. The method of claim 15, further comprising determining symbols consecutively mapped for the ePSS and a primary synchronization signal (PSS) when the eSS/PBCH block includes symbols mapped for the ePSS and the PSS, the symbols being included in the multiple consecutive symbols of the eSS/PBCH block.

17. The method of claim 15, further comprising, when the eSS/PBCH block includes symbols mapped for the eSSS and a secondary synchronization signal (SSS):
   determining the symbols that are non-consecutively mapped for the eSSS and the SSS, the symbols of the multiple consecutive symbols being included in the eSS/PBCH block; and
   determining at least one symbol that is mapped for the ePBCH, the at least one symbol being located between a symbol mapped for the eSSS and a symbol mapped for the SSS.

18. The method of claim 15, further comprising:
   determining a sequence to be used for constructing the ePSS; and
   determining a polynomial for an M-sequence generating the determined sequence, wherein the polynomial for the M-sequence is given by $g(x)=x^7+x+1$.

19. The method of claim 15, further comprising determining a sequence constructing the eSSS based on a sequence constructing a secondary synchronization signal (SSS) with a predefined scrambling sequence.

20. The method of claim 15, further comprising:
   determining other resources to receive a demodulation reference signal (DMRS) of the ePBCH, the other resources to receive the DMRS of the ePBCH being a subset of the resources to receive the eSS/PBCH block; and
   determining a sequence to be used for constructing the DMRS of the ePBCH, the sequence carrying timing information that includes at least one of part of a system frame number (SFN) or timing offset between a start of the eSS/PBCH block and a start of a half frame where the eSS/PBCH block is located.

* * * * *